(12) United States Patent
Nakayama et al.

(10) Patent No.: US 8,235,534 B2
(45) Date of Patent: Aug. 7, 2012

(54) PROJECTOR THAT PROJECTS A CORRECTION IMAGE BETWEEN CYCLIC MAIN IMAGE SIGNALS

(75) Inventors: Kenji Nakayama, Osaka (JP); Tatsuo Itoh, Osaka (JP); Hiroyuki Furuya, Osaka (JP); Shinichi Kadowaki, Hyogo (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 12/669,874

(22) PCT Filed: May 20, 2009

(86) PCT No.: PCT/JP2009/002232
§ 371 (c)(1),
(2), (4) Date: Jan. 20, 2010

(87) PCT Pub. No.: WO2009/142015
PCT Pub. Date: Nov. 26, 2009

(65) Prior Publication Data
US 2010/0201894 A1    Aug. 12, 2010

(30) Foreign Application Priority Data

May 21, 2008  (JP) ................................. 2008-132762
May 29, 2008  (JP) ................................. 2008-140346

(51) Int. Cl.
*G03B 21/14* (2006.01)
*G02B 1/10* (2006.01)
*H04N 9/28* (2006.01)
*G01R 13/30* (2006.01)
*G06K 9/46* (2006.01)
*G06K 9/20* (2006.01)
*G01T 1/166* (2006.01)

(52) U.S. Cl. ............ 353/69; 359/583; 348/807; 73/1.45; 73/510; 382/236; 382/317; 382/275; 250/363.07

(58) Field of Classification Search .................. 353/69; 359/583; 348/807; 73/1.45, 510; 382/236, 382/317, 275; 250/363.07
See application file for complete search history.

(56) References Cited

U.S. PATENT DOCUMENTS

| 4,684,996 | A | 8/1987 | Baumeister | |
| 5,337,159 | A * | 8/1994 | Iida et al. | 358/447 |
| 6,393,162 | B1 * | 5/2002 | Higurashi | 382/284 |

(Continued)

FOREIGN PATENT DOCUMENTS

JP  6-110403  4/1994

(Continued)

OTHER PUBLICATIONS

International Search Report issued Aug. 25, 2009 in International (PCT) Application No. PCT/JP2009/002232.

*Primary Examiner* — Georgia Y Epps
*Assistant Examiner* — Magda Cruz
(74) *Attorney, Agent, or Firm* — Wenderoth, Lind & Ponack, L.L.P.

(57) ABSTRACT

A projector has: light source (1R, 1G, 1B); a light modulation unit (6) that modulates a light emitted from the light source based on image signals; a display control unit (41) that outputs the image signals including main cyclic image signals to the light modulation unit, and controls the display thereof; a projection unit (7) that projects the image based on the light modulated by the light modulation unit; and an imaging unit (40) that captures an image to be displayed based on the light projected from the projection unit, and the display control unit inserts a correction image signal for projecting a correction image, which is visually recognized as a uniform white or gray screen when time integration is performed, between the cyclic main image signals.

27 Claims, 31 Drawing Sheets

U.S. PATENT DOCUMENTS

| | | |
|---|---|---|
| 6,670,603 B2 | 12/2003 | Shimada et al. |
| 7,001,023 B2 | 2/2006 | Lee et al. |
| 2002/0181802 A1* | 12/2002 | Peterson .................. 382/284 |
| 2003/0010888 A1 | 1/2003 | Shimada et al. |
| 2005/0030486 A1 | 2/2005 | Lee et al. |
| 2007/0110304 A1 | 5/2007 | Tsukada |
| 2008/0259170 A1* | 10/2008 | Hatanaka ................ 348/208.6 |

FOREIGN PATENT DOCUMENTS

| | | |
|---|---|---|
| JP | 7-162790 | 6/1995 |
| JP | 10-161255 | 6/1998 |
| JP | 2003-29201 | 1/2003 |
| JP | 2003-76494 | 3/2003 |
| JP | 2005-94599 | 4/2005 |
| JP | 2005-204043 | 7/2005 |
| JP | 2006-109380 | 4/2006 |
| JP | 2007-65099 | 3/2007 |
| JP | 2007-295375 | 11/2007 |
| WO | 2005/015904 | 2/2005 |
| WO | 2005/057941 | 6/2005 |
| WO | 2009/028262 | 3/2009 |

\* cited by examiner

FIG.3
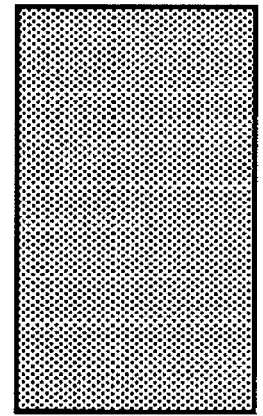
SUPERIMPOSED IMAGE
=
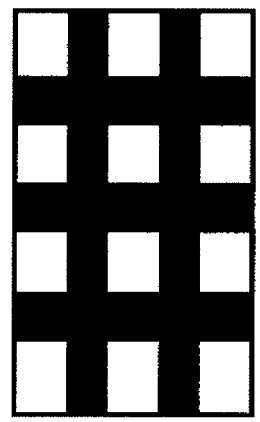
PATTERN IMAGE B
+
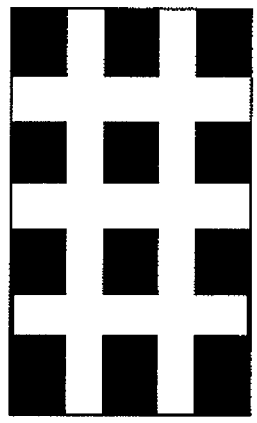
PATTERN IMAGE A

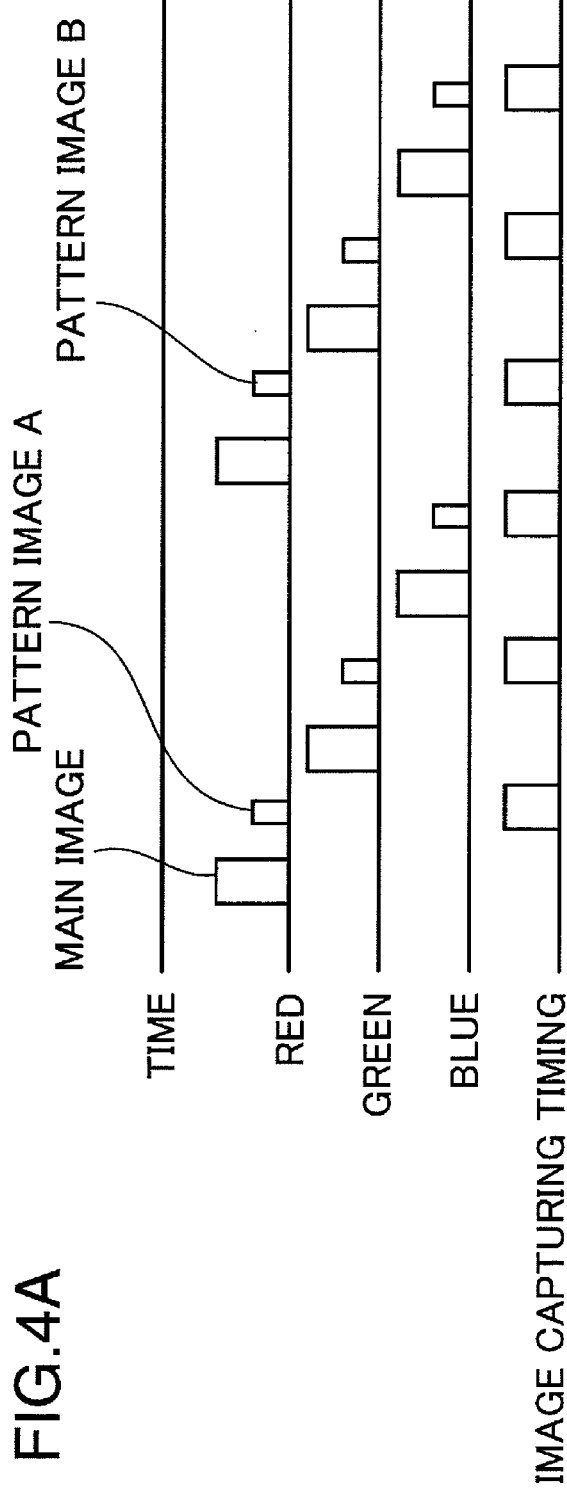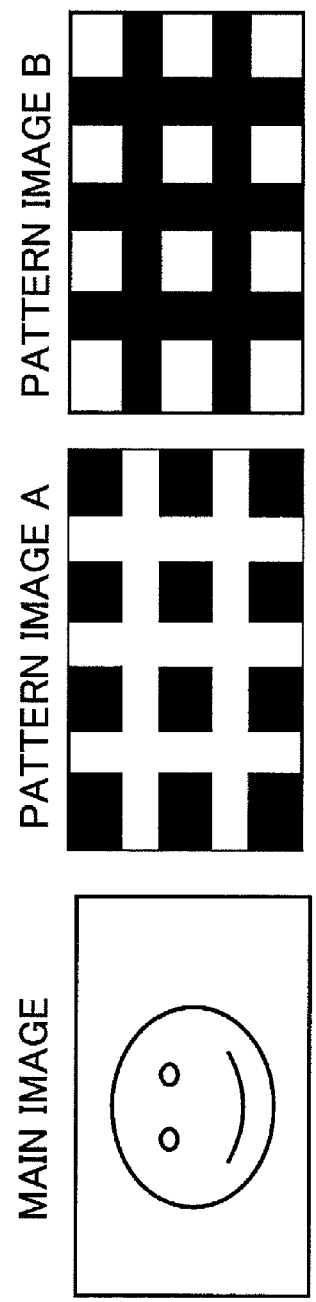
FIG.4A
FIG.4B

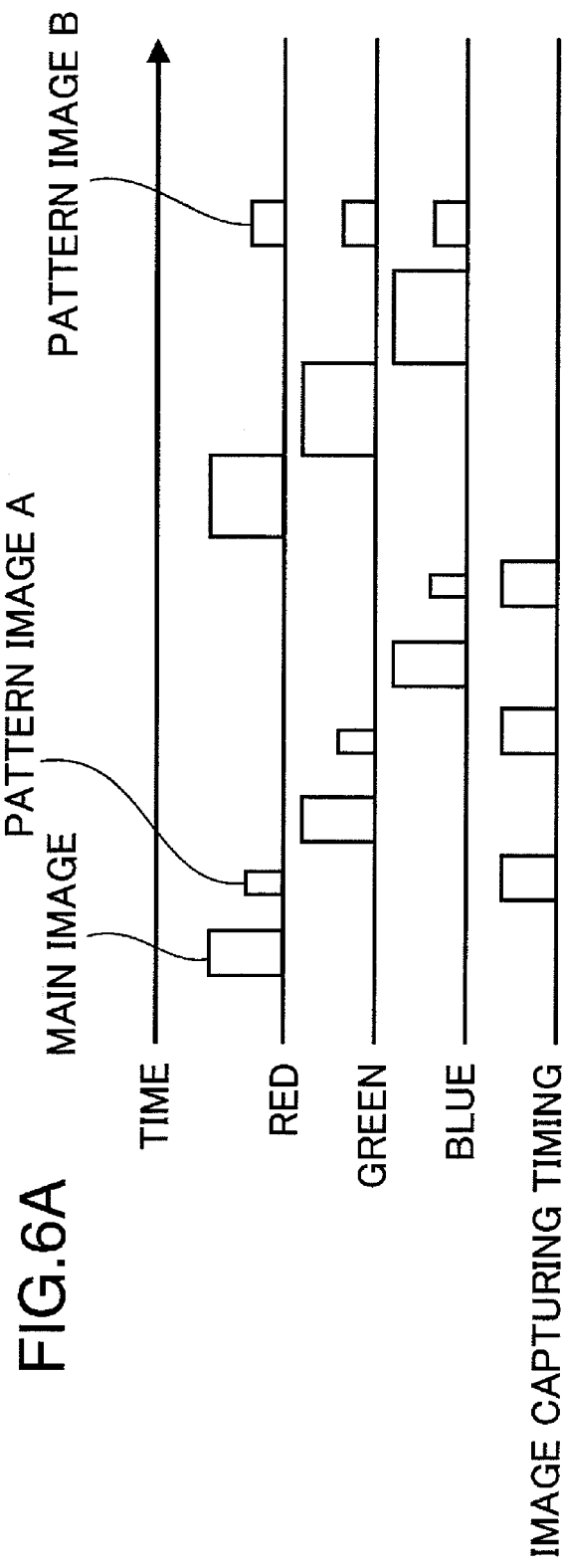
FIG.6A
FIG.6B

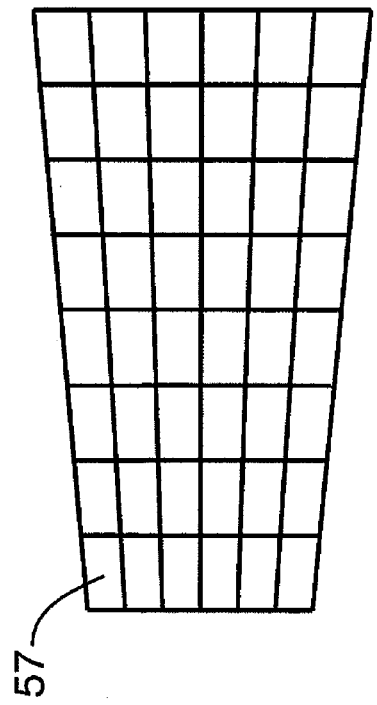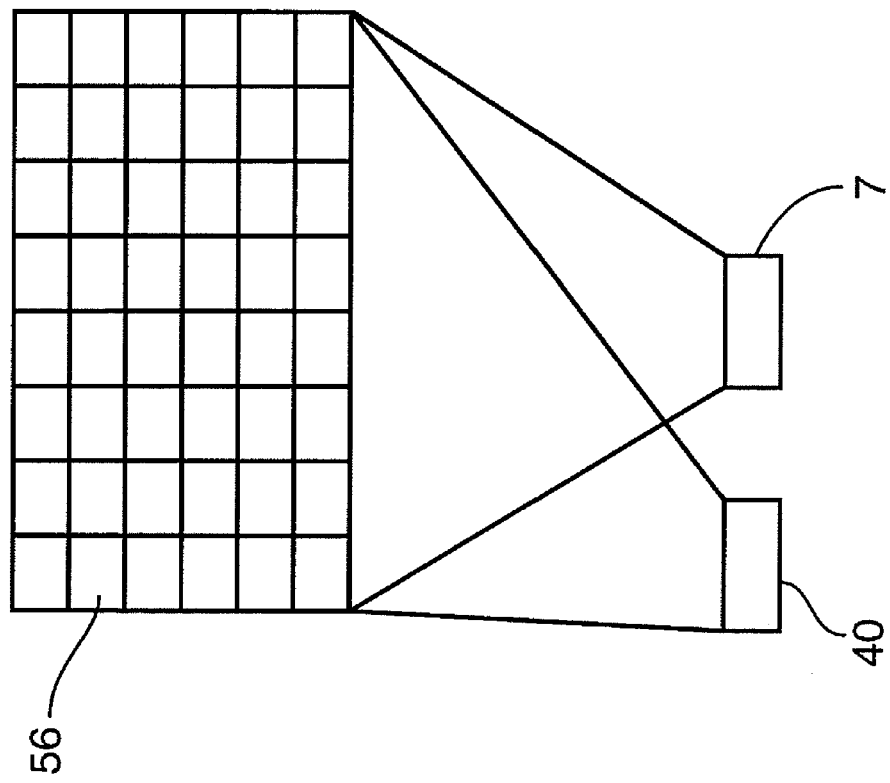

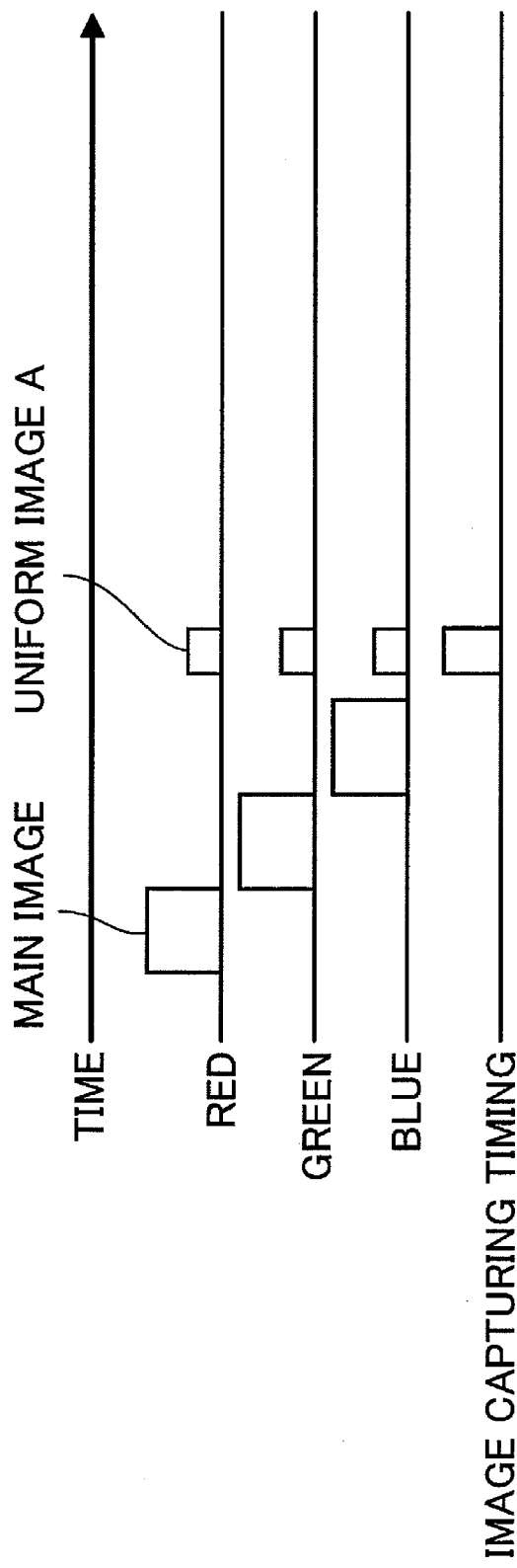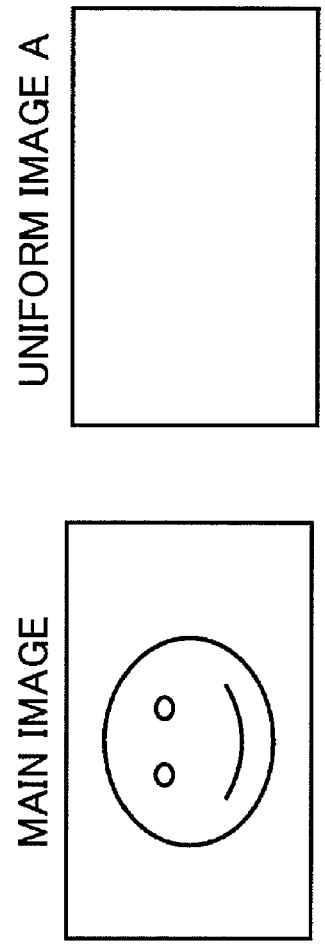
FIG.8A
FIG.8B

TWO-DIMENSIONAL CODE B

TWO-DIMENSIONAL CODE A

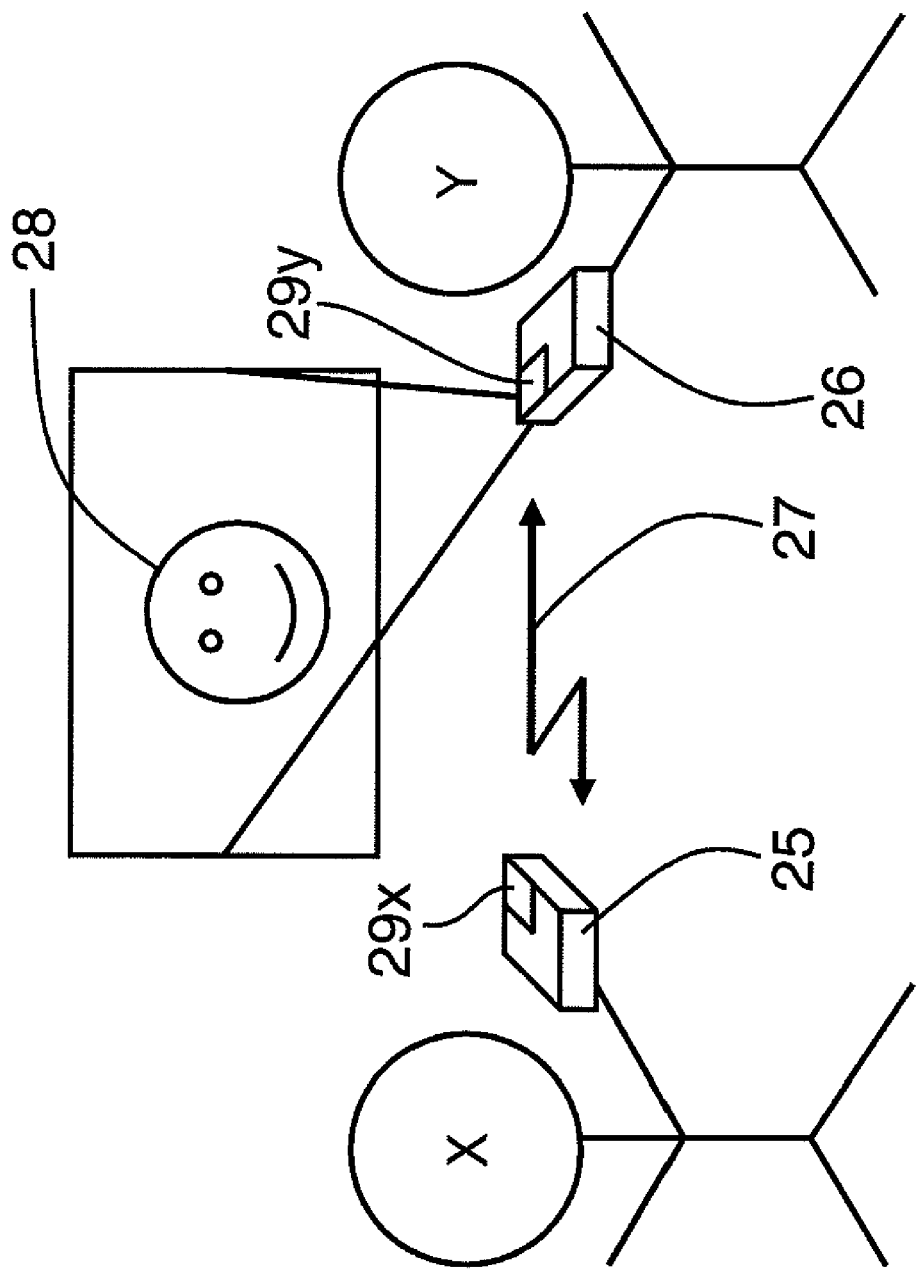

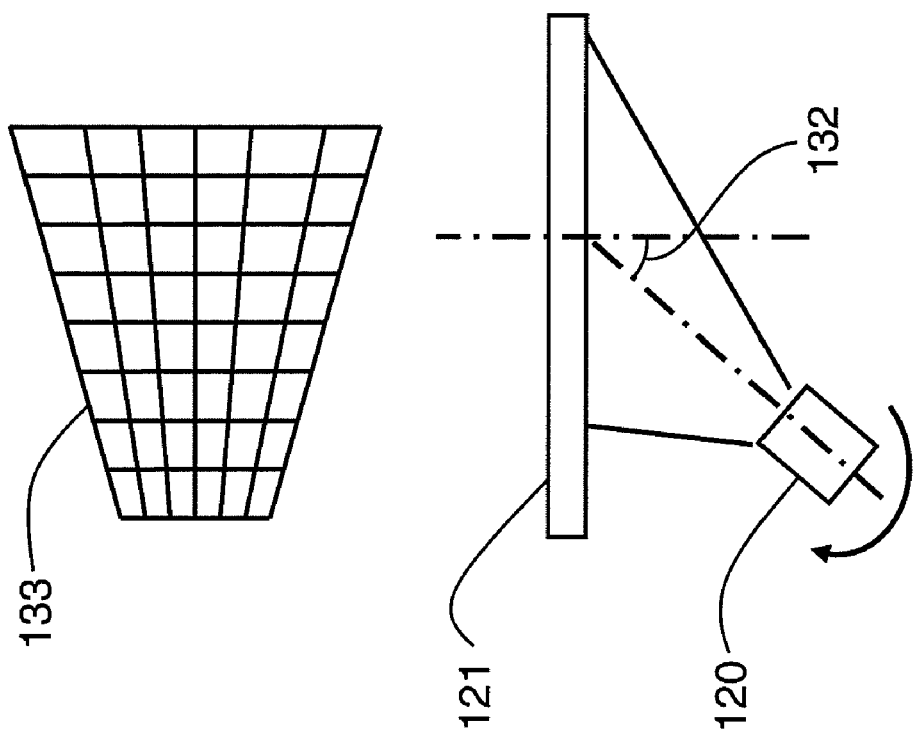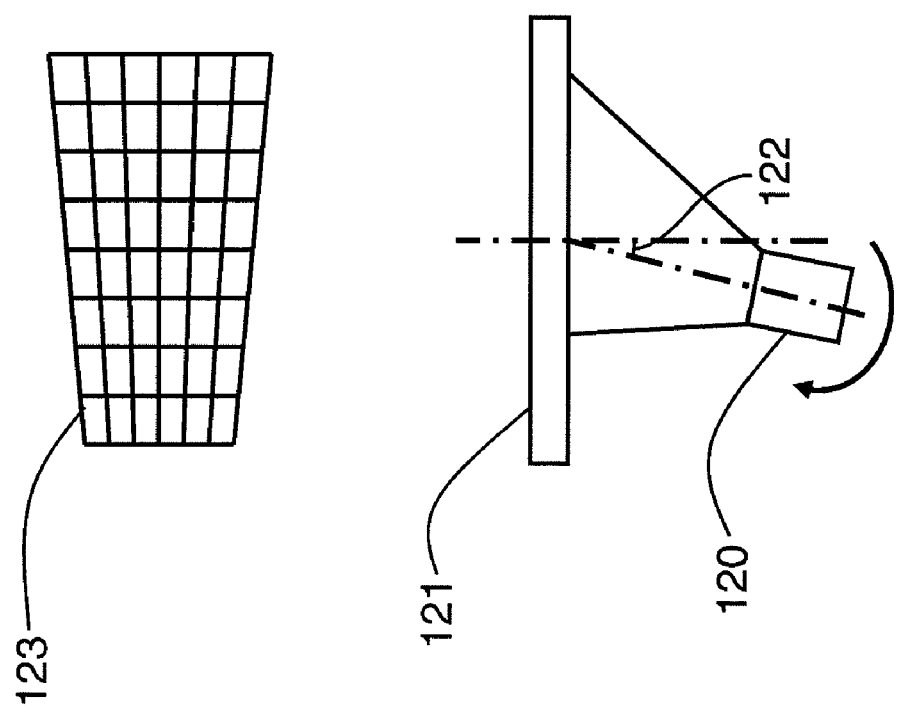

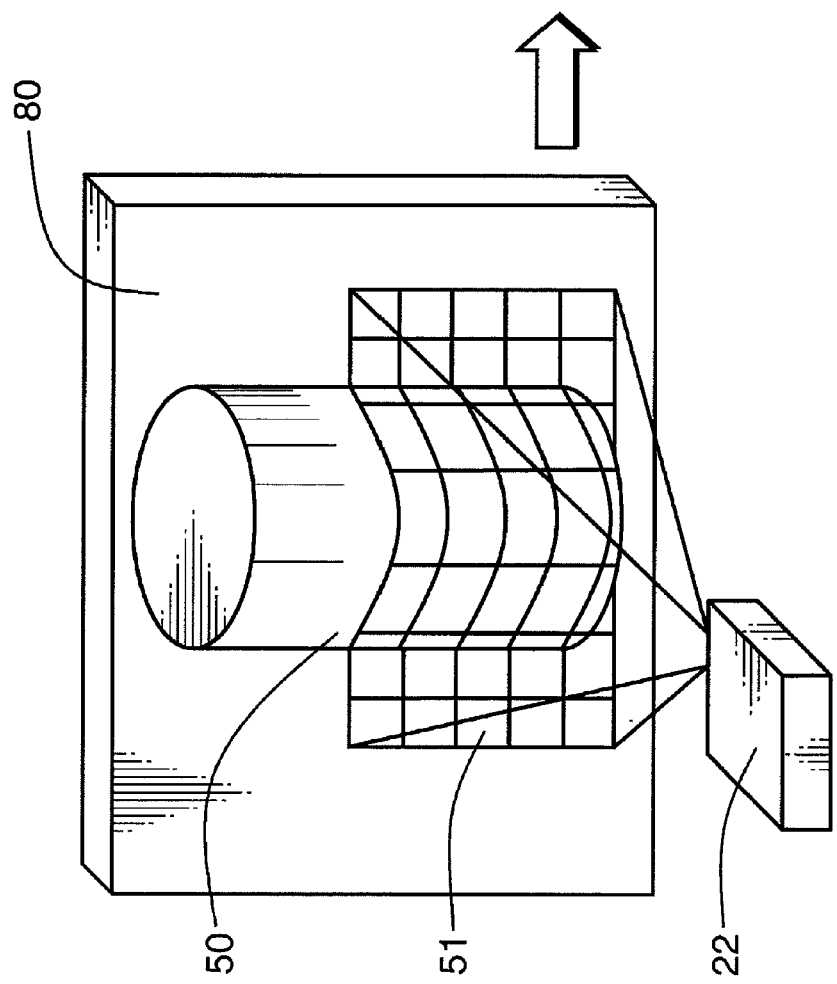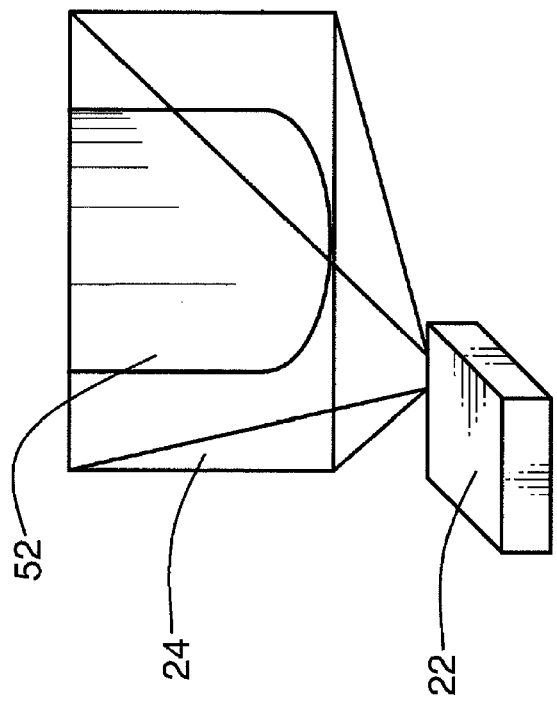

PROJECTOR THAT PROJECTS A CORRECTION IMAGE BETWEEN CYCLIC MAIN IMAGE SIGNALS

TECHNICAL FIELD

The present invention relates to a projector that projects an image on a projection target.

BACKGROUND ART

Recently compactness with good portability is demanded for projectors, and even pocket sized projectors, which can be carried around in a pocket, have been the subject of research and development. As such downsizing progresses, downsizing of an optical system of projectors, constituted by a light source, spatial modulation element and projection optical system, using an LED (Light Emitting Diode) or laser, instead of a lamp, is also under consideration.

A pocket sized compact projector can always be carried around, and the way of use is dramatically different from conventional stationary projectors. Such a compact project has good portability, and a user can use the projector that is hand held to project onto a nearby wall and/or object in order to view an image thereof. This pocket sized compact projector can be used even during movement, such as walking. This means that with a pocket sized compact projector, it is expected that the project target to be a screen constantly changes.

In this case, the screen to be the project target is not always flat nor is it always white. In order to present high image quality in such a case, it is preferable to correct the image to be projected according to the surface form and color of the projection target.

Hence for a pocket type compact projector, in order to obtain a high quality image, it is essential to have a correction function to acquire information on the form and color of the target to be a screen, and to correct the image to be projected based on the information.

According to the conventional correction method to correct a projection image, the projector is secured to a table or the like, then a test pattern image, that is an image for correction, is projected onto a projection target, such as a screen, before projecting an actual image. Then image correction is executed by capturing the test pattern image and recognizing the form of the projection target.

Since an image to be projected is normally rectangular, some projectors detect four corners of a projected image, discern whether the projected image is distorted into a trapezoid, and correct the trapezoidal distortion based on this discerned result.

The above mentioned conventional correction method for correcting a projection image is based on the assumption that a stationary type projector is used, and once a projection image is corrected, a predetermined correction is performed on a projection image without changing the relative positions of the projector and screen as a rule. However if the projection target to be a screen changes constantly, like the case of a compact portable projector, the projection image must be corrected constantly according to the change of the projection target. This means that appropriate correction is not possible with the conventional correction method for a projection image, that is based on the assumption that the relative positions of the projector and screen are fixed.

In other words, in the case of the trapezoidal correction method in which four corners of the projected image are detected, an image changing constantly can be corrected in a state of the image being projected. This method of correcting the four corners of the image, however, is based on the assumption that the image is basically projected onto a flat screen, so the inner distortion of the projected image cannot be detected. In a case of a pocket sized portable projector, a projection target is not always a flat screen, such as a wall, as mentioned above. In some cases, a projection may be performed on a curved surface or a three-dimensional object having bumps on the surface, which a conventional correction method cannot support.

According to Patent Document 1, an image A and image B, which are two types of images, on which a test pattern image is superimposed respectively, are displayed, so the user sees the image on which two test pattern images are superimposed. In this case, a dramatic deterioration of image quality is inevitable since the test pattern images are superimposed on an originally observed image. And in order to detect the test pattern images, the imaging device requires a processing function to extract test patterns from the image captured by the imaging device by computing image A and image B, which makes processing complicated.

As a correction method for an image projected by a compact projector, of which project target to be a screen changes constantly, the correction method disclosed in Patent Document 1, for example, has been proposed. According to the correction method disclosed in Patent Document 1, a test pattern is superimposed on the image signals and the test pattern image is detected at the same time with observing the image. If the test pattern image is simply superimposed here, extraction of the test pattern becomes difficult depending on the image signals. In order to avoid extraction of the test pattern from becoming difficult depending on the image signals, Patent Document 1 discloses that a white background is set to all gray, where two images on which a test pattern is superimposed is projected and captured, and these two images are computed so that the test pattern image is enhanced and extracted.

In the case of the correction method of Patent Document 1, however, two types of images on which the test pattern image is superimposed (image A and image B) are displayed, so observers see images on which the test pattern is superimposed. In other words, the test pattern is generated on the original image that is to be observed, so image quality dramatically deteriorates. Also in order to detect the test pattern, a processing function to compute image A and image B, acquired by the imaging device, and to extract the test pattern, is required, which makes processing for correcting the projection image complicated.

Patent Document 1: Japanese Patent Application Laid-Open No. 2005-94599
Patent Document 2: Japanese Patent Application Laid-Open No. 2003-29201

SUMMARY OF THE INVENTION

It is an object of the present invention to provide a projector that has a simple configuration and can insert an image for correction according to a constantly changing projection target while suppressing deterioration of the image quality of the main image.

In order to achieve this object, a projector according to an aspect of the present invention has: a light source; a light modulation unit that modulates a light emitted from the light source based on image signals; a display control unit that outputs the image signals including cyclic main image signals to the light modulation unit and controls the display thereof; a projection unit that projects the light modulated by the light modulation unit; and an imaging unit that captures an image based on the light projected from the projection unit, and the display control unit inserts a correction image signal for projecting a correction image, which is visually recognized as a uniform white or gray screen when time integration is performed, between the cyclic main image signals.

According to the above mentioned configuration, a correction image, that is recognized as a uniform white or gray screen when images other than the main image are time integrated, is inserted between cyclic main image signals, so the user who is observing the main image does not recognize the correction image. Therefore the correction image can be inserted while suppressing deterioration of the image quality of the main image.

Further objects, features and advantages of the present invention will become more apparent upon reading the following description. Advantages of the present invention will be more apparent upon reading the following description with reference to the accompanying drawings.

BRIEF DESCRIPTION OF THE DRAWINGS

FIG. 3 is a diagram depicting each pattern image shown in FIG. 2A and FIG. 2B, and an image when these pattern images are superimposed.

FIG. 4A is a diagram depicting an example of an insertion timing of a main image signal of each color, insertion timing of a correction image signal, and timing to capture the correction image according to an embodiment of the present invention; and FIG. 4B is a diagram depicting an example of the main image and correction images of FIG. 4A.

FIG. 6A is a diagram depicting an example of an insertion timing of a main image signal of each color, insertion timing of a correction image signal, and timing to capture the correction image according to an embodiment of the present invention; and FIG. 6B is a diagram depicting an example of the main image and correction images of FIG. 6A.

FIG. 7A is a diagram depicting a state of projecting a pattern image onto a flat projection target; and FIG. 7B is a diagram depicting a captured pattern image.

FIG. 8A is a diagram depicting an example of an insertion timing of a main image signal of each color, insertion timing of a correction image signal, and timing to capture the correction image according to another embodiment of the present invention; and FIG. 8B is a diagram depicting an example of the main image and correction images of FIG. 8A.

FIG. 13 is a diagram depicting a state when a plurality of projectors are sending/receiving synchronization signals according to another embodiment of the present invention.

FIG. 20A is a diagram depicting a relative angle of a projector and a projection target, and a pattern image to be captured; and FIG. 20B is a relative angle of a projector and a projection target, that is different from FIG. 20A, and a pattern image to be captured.

FIG. 22A is a diagram depicting an example of applying the projector according to an embodiment of the present invention; and FIG. 22B is a diagram depicting another example of applying the projector according to an embodiment of the present invention.

EMBODIMENTS OF THE INVENTION

Embodiments of the present invention will now be described with reference to the drawings.

Embodiment 1

A projector according to Embodiment 1 of the present invention will now be described with reference to FIG. 1 to FIG. 7.

Figure 1:
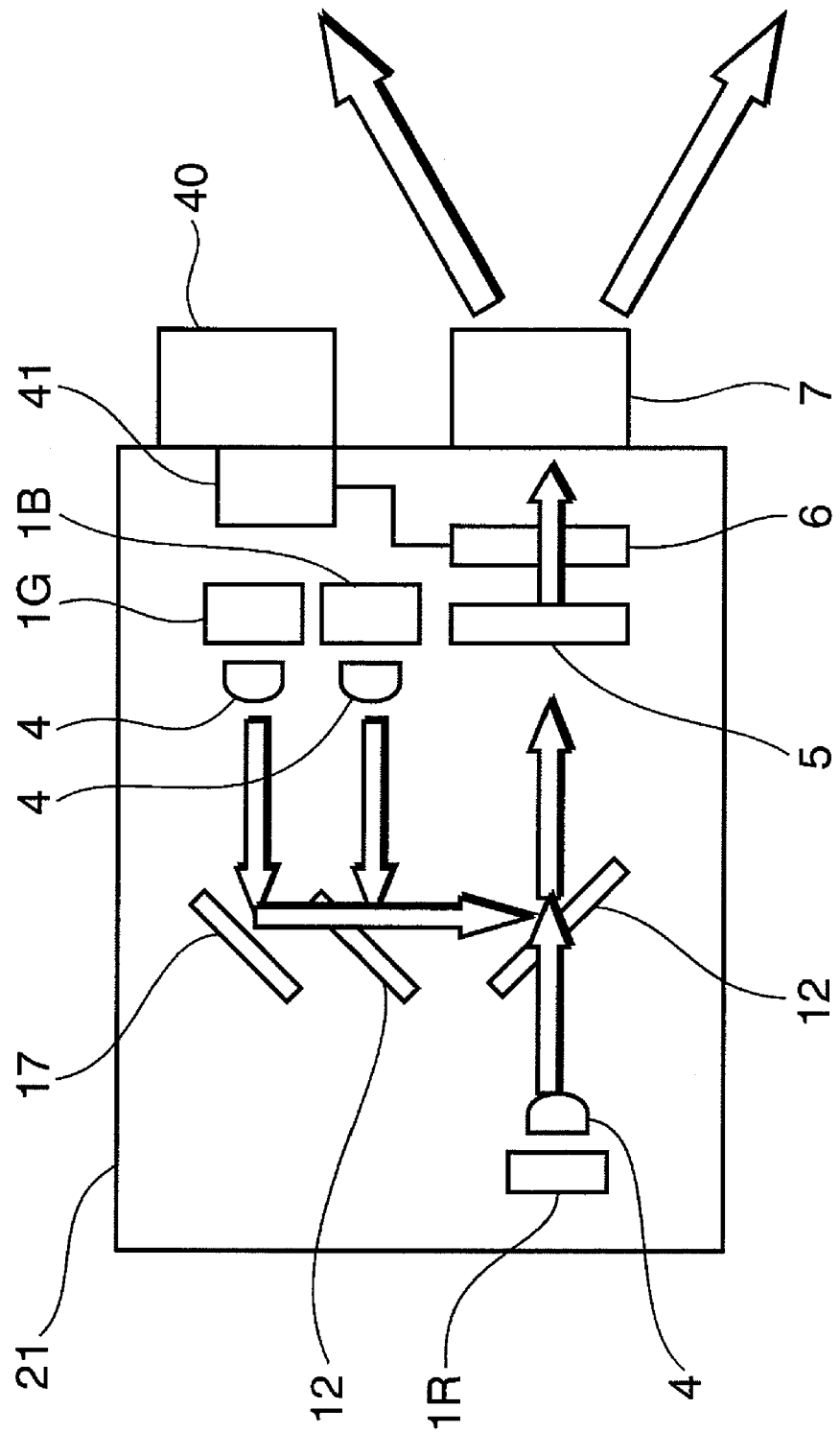
FIG. 1 is a diagram depicting a general configuration of a projector according to an embodiment of the present invention.

FIG. 1 shows a general configuration of the projector 22 according to Embodiment 1 of the present invention.

As FIG. 1 shows, the present projector 22 has a laser light source 1R, laser light source 1G and laser light source 1B for each color, collimator lenses 4, lenticular lens 5, spatial modulation element 6, projection lens 7 and dichroic mirrors 12. From the laser light sources 1R, 1G and 1B, red, blue and green laser lights are emitted sequentially. The green laser light becomes substantially parallel light by the collimator lens 4, and then is reflected by a mirror 17, and transmits through the dichroic mirror 12. The blue laser light becomes approximately parallel light by the collimator lens 4, and then is multiplexed with the green laser light by the dichroic mirror 12. The red laser light becomes substantially parallel light by the collimator lens 4, then is multiplexed with the green laser light and the blue laser light by the dichroic mirror 12.

The multiplexed laser light becomes diffused light by the lenticular lens 5, and enters the spatial modulation element 6. The spatial modulation element 6 modulates the entered light based on cyclic main image signals. The projection lens (projection unit) 7 projects the light modulated by the spatial modulation element 6 onto the screen (not illustrated). An imaging element 40 captures the image displayed by the light projected from the projection lens 7. The image captured by the imaging element 40 is processed by an image correction controller 41. The image correction controller (display control unit/correction unit) 41 outputs image signals, including cyclic main image signals, to the spatial modulation element 6 for controlling the display of the image.

Now the timing to insert the correction image signal and the timing for the imaging element 40 to capture the image will be described with reference to FIG. 2A and FIG. 2B.

Figure 2A:
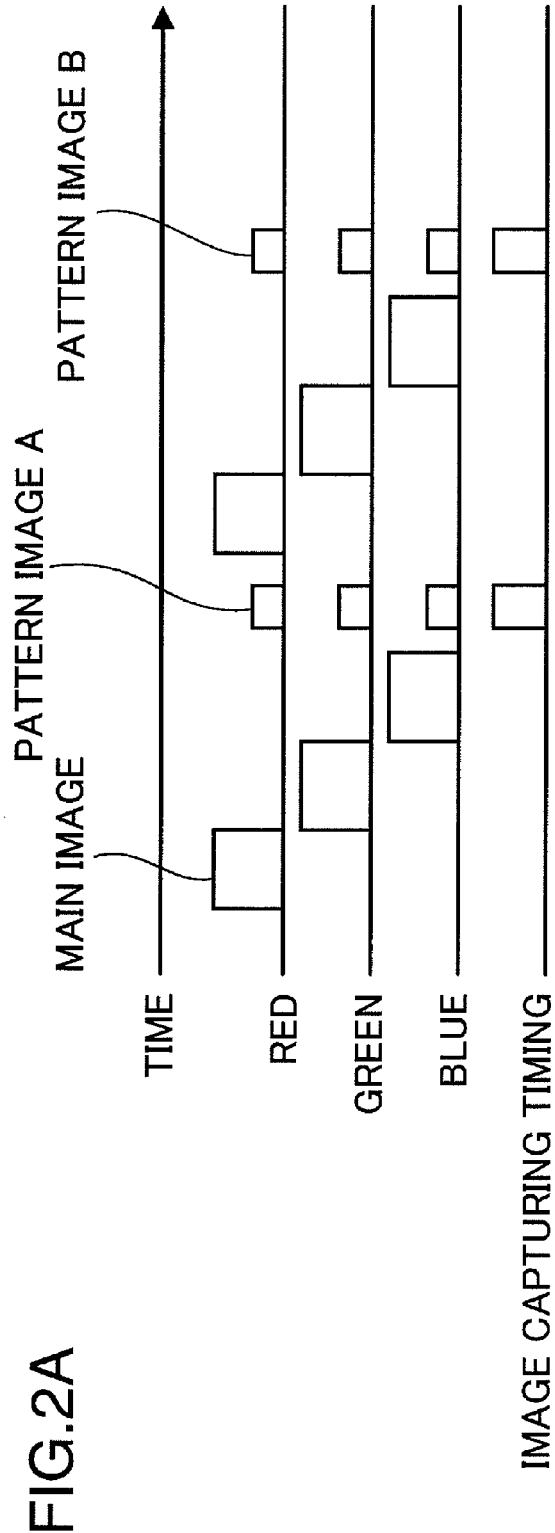
FIG. 2A is a diagram depicting an example of an insertion timing of a main image signal of each color, insertion timing of a correction image signal, and timing to capture the correction image according to an embodiment of the present invention.
Figure 2B:
FIG. 2B is a diagram depicting an example of the main image and correction images of FIG. 2A.

FIG. 2A and FIG. 2B show the insertion timings of each RGB main image signal, the insertion timing of the correction image signal, and the timing for the imaging element 40 to capture the pattern image according to control of the image correction controller 41.

As FIG. 2A and FIG. 2B show, the imaging element (imaging unit) 40 according to the present embodiment captures the correction image, synchronizing with each timing of projecting pattern image A and pattern image B as the correction images.

The projector 22 according to the present embodiment uses the time division image display system, and switches a laser light for each color at high-speed. In other words, the laser light source 1R, 1G and 1B for each color turns ON at every predetermined time, and each color image of R, G and B, constituting the main image, is cyclically projected in sequence according to the lighting timing. At this time, the drive frequency of each color image R, G and B is at least 60 Hz or more, preferably 180 Hz or more. If the drive frequency is 60 Hz or less, a color after image noise, called "color breaking noise" is extensively generated, which deteriorates image quality dramatically. If the drive frequency is 180 Hz or more, color breaking noise is hardly recognized by the user.

In the configuration in FIG. 2A, pattern A is inserted between the projection of a set of main images constituted by each color R, G and B and the next projection of a set of main images constituted by R, G and B, and pattern image B is inserted between the projection of a set of main images constituted by R, G and B and the next projection of a set of main images constituted by R, G and B. Thereafter pattern image A and pattern image B are alternately inserted between a set of main images and a next set of main images which are sequentially projected.

In other words, when images other than the main images are time-integrated by control of the image correction controller (display control unit) 41 shown in FIG. 1, the correction image signal for projecting a correction image that is visually recognized as a uniform white or gray screen is inserted between cyclic main image signals.

Pattern image A and pattern image B are displayed by the laser light source 1R, laser light source 1G and laser light source 1B that are simultaneously turned ON. In other words, each pattern image A and B of the present embodiment is not a pattern image generated by a single color light, but is a pattern image generated by a light in which the red laser light, green laser light and blue laser light are superimposed. The laser output power ratio of the laser light source 1R, laser light source 1G and laser light source 1B for each color R, G and B have been set so that this superimposed light becomes white light. White light is normally represented by black body radiation temperature. For example, in order to generate white light corresponding to black body radiation temperature 9000K, the output power ratio of the red laser light (640 nm wavelength), green laser light (532 nm wavelength) and blue laser light (448 nm wavelength), that are emitted from the projection lens 7 of the projector 22, is 1:0.83:0.78. Thereby light that is contained in pattern image A and pattern image B can be only white light.

FIG. 3 shows pattern image A, pattern image B shown in FIGS. 2A and 2B, and an image in which pattern image A and pattern image B are superimposed. Pattern image A and pattern image B are generated by white light. The image in which these images are superimposed therefore becomes an image that has only white light. In pattern image A, the lattice portion is white. In pattern image B, on the other hand, the lattice portion is black. Therefore if pattern image A and pattern image B are superimposed, a uniform gray image (light is only white light) is generated. Since the user recognizes an image in which pattern image A and pattern image B are superimposed, the user recognizes this as if a gray image is inserted in the main image.

According to the above configuration, the user does not directly recognize pattern image A and pattern image B which have lattice patterns, but recognizes a uniform gray image in which pattern A and pattern B are superimposed, so deterioration of image quality in the main images can be suppressed. By using the lattice pattern image for a correction image, the bumps of the surface of the projection target, to be a screen, can be easily known.

To observe the main image with high image quality, it is preferable to provide a function to adjust the brightness of the pattern image according to the contrast of the image. The projector 22 determines the contrast of the projection image using an image captured by the imaging element 40, and adjusts the brightness of the pattern image according to this contrast. If the contrast of an image is high, the user can recognize the image even with a weak light. Therefore it is preferable to set the brightness of the pattern image to be low. Then even if correction image signals, for projecting a correction image, are inserted among cyclic main image signals, light to project the correction image is weak, which can prevent the main image from becoming white, and can provide an image with less deterioration. Since the power to be supplied to the laser light source is low, a projector with low power consumption can be implemented.

In the configuration shown in FIG. 4A and FIG. 4B, a set of (R) image, (G) image and (B) image, that are sequentially projected, is used for each of pattern image A and pattern image B. The correction image signal of each color R, G and B, for projecting the correction image, is sequentially inserted after the main image signal for each color R, G and B for sequentially projecting the (R) image, (G) image and (B) image constituting the main image.

In the configuration in FIG. 4A as well, the insertion timing of each correction image signal is between cyclic main image signals so that the correction image is visually recognized as a uniform white or gray screen when images other then the main image are time-integrated by the control of the image correction controller (display control unit) 41 shown in FIG. 1.

The timing for the imaging element 40 to capture pattern image A and pattern image B, as the correction images, synchronizes with each timing to project these pattern images.

Because of this configuration, when the correction images A and B are captured, influence of reflectance on the surface of the projection target to be a screen can be decreased, so the correction images A and B can be captured accurately.

It is preferable that the spatial modulation element 6 can modulate at 360 Hz or more. In this case, flickering of the main image can be suppressed since the image of each color R, G and B of the main image can be modulated at 60 Hz or more and projected.

A method for knowing the form of the projection target projection surface using the pattern images according to the present embodiment will now be described with reference to FIG. 5A and FIG. 5B.

Figure 5B:
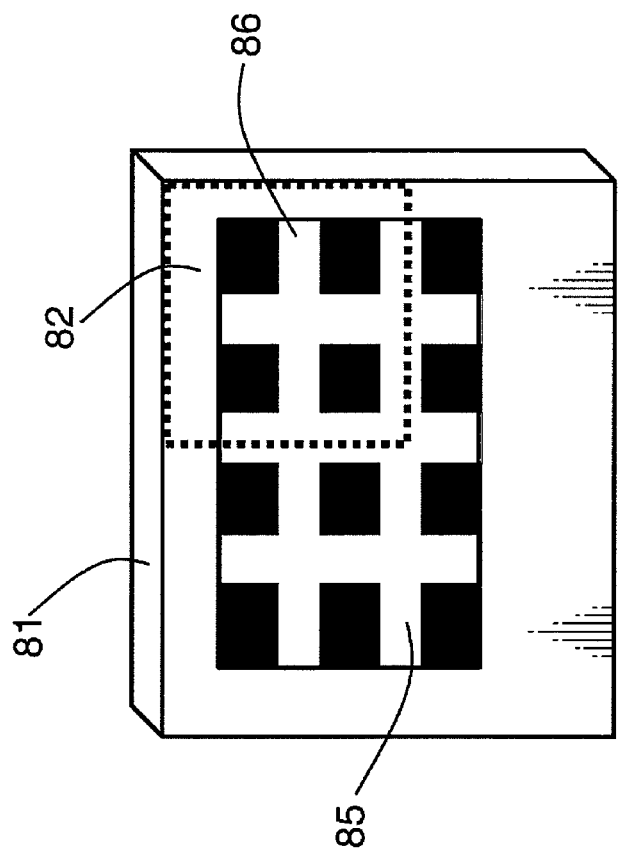
FIG. 5B is a diagram depicting a state of projecting a pattern image of a single color laser light.
Figure 5A:
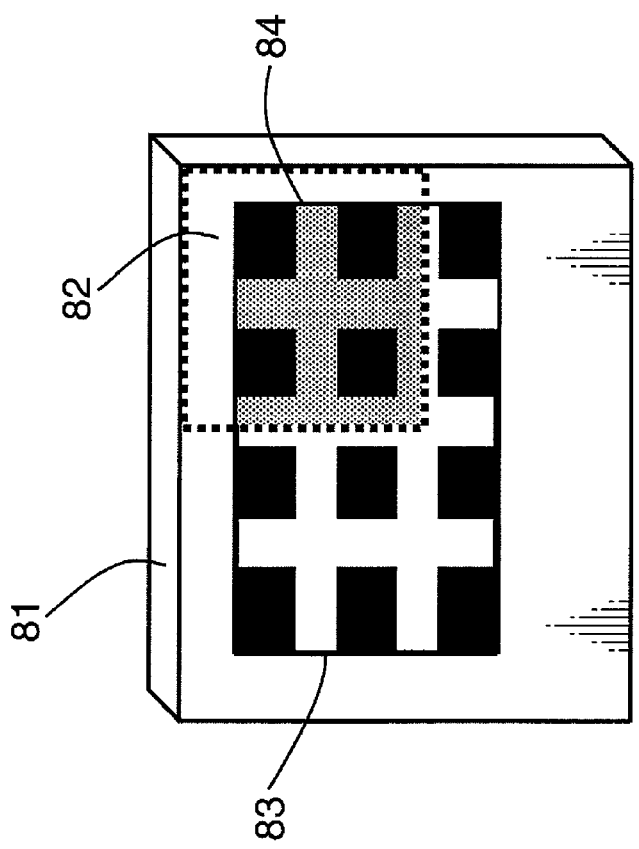
FIG. 5A is a diagram depicting a state of projecting a pattern image of a white laser light.

FIG. 5A and FIG. 5B show a comparison of a case when a pattern image formed by a white light is projected onto a projection target of which reflectance is partially different, and a case when a pattern image formed by a single color light is projected. FIG. 5A shows a case of projecting the white light pattern image, and FIG. 5B shows a case of projecting a pattern image of a red (single color) laser light. If the reflectance of the projection target surface to be a screen is partially different depending on the wavelength of the incident light, the brightness difference of the pattern images reflected from the projection target is greater in each R, G or B laser light (single color light) than a white color light in which red laser light, green laser light and blue laser light are superimposed (FIG. 5A), therefore distortion of the pattern image can be easily detected.

In the projection target 81 of which reflectance is partially different, the reflectance of the green laser light is lower in the area 82 enclosed by the dotted line compared with the other area. The lattice pattern image projected by the projector (not illustrated) becomes bright lines in the area 83 of the lattice pattern image in the case of white light, as shown in FIG. 5A, but becomes dark lines in the area 84 in the area 82 compared with the area 83, since the reflectance of the green laser light is low.

In FIG. 5B, where a red pattern image is projected, on the other hand, the reflectance of the red laser in the area 82 is the same as the other area. Therefore in the case of projecting the red pattern image, the area 85 and the area 86 have the same bright lines. As a result, when the pattern image is captured, the brightness of the lines of the lattice pattern become more uniform than the case of white light, and the state of the pattern image can be easily recognized. By using this configuration, image processing using pattern images can be easier.

For the imaging element 40 according to the present embodiment, an imaging element that does not have the imaging unit for a color image may be used. In this case, an image is corrected using only the brightness difference of the captured pattern image. If an imaging element that does not have a color image capturing function is used like this, the cost of the projector can be decreased.

In the configuration in FIG. 6A, each correction image signal for sequentially projecting the (R) image, (G) image and (B) image constituting pattern image A is inserted after each color main image signal for sequentially projecting the (R) image, (G) image and (B) image constituting the main image respectively. Each color correction image signal for R, G and B for projecting pattern image B, on the other hand, is simultaneously inserted after each main image signal for sequentially projecting the (R) image, (G) image and (B) image constituting the main image. Since this decreases the modulation count of the spatial modulation element 6, power consumption of the projector can be decreased.

Image correction processing using the projector 22 according to the present embodiment will now be described. In the projector 22, the projection lens 7 and the imaging lens of the imaging element 40 are distant, so parallax is generated between the projection and capturing image. Therefore the pattern image projected from the projection lens 7 to the projection target and the pattern image captured by the imaging element 40 are shifted by the amount of parallax.

FIG. 7A and FIG. 7B are diagrams depicting the projection and capturing of a pattern image. FIG. 7A shows the projection of the pattern image in a state where the projection lens 7 and the flat projection target face each other. FIG. 7B shows an image when the projected pattern image shown in FIG. 7A is captured by the imaging element 40. The projection lens 7 projects the pattern image 56 on the flat projection target (not illustrated). In this case, the imaging element 40 captures the distorted pattern image 57 shown in FIG. 7B according to the parallax with the projection lens 7.

Since the projection lens 7 and the imaging lens 40 have this parallax, the pattern image to be captured changes depending on the relative angle of the projection lens 7 and the projection target surface, and the bumps on the projection target surface. The projector 22 according to the present embodiment compares the captured pattern image with the pattern image 57, for example, so that the relative angle of the projection lens 7 and the projection target, and the bumps on the projection target surface can be recognized. According to the projector 22 of the present embodiment, the image can be corrected by distorting the main image such that the pattern image to be captured becomes the pattern image 57, for example. Because of this configuration, a high quality main image with little distortion can be provided even if the relative angle of the projection lens 7 and the projection target changes or if the projection target surface has bumps.

The color or brightness of the projection target to be a screen itself may be cancelled, so that a correction image that is visually recognized as uniform white or gray in the surface of the projection target when time integration is performed is constantly generated, and this correction image is inserted between cyclic main images. In other words, the color or brightness of the projection target itself, captured by the imaging element 40 during a non-projection period of the main image that is projected at a predetermined frequency, is cancelled, a correction image signal for projecting a correction image, that is visually recognized as uniform white or gray on the surface of the projection target when time integration is performed, is generated, and this correction image signal is inserted between cyclic main image signals.

In this case, even if the relative position of the projector 22 and the projection target changes constantly, the projection target itself is constantly captured by the imaging element 40 at the timings in the non-projection period of the main image that is projected at a predetermined frequency. Then the color or brightness of the projection target itself is cancelled, and the correction image that is visually recognized as uniform white or gray on the surface of the projection target when time integration is performed, is constantly generated, and this correction image is inserted between cyclic main images. Since the correction image can also be used substantially for color correction or brightness correction of the main image, a projector that projects a main image with higher image quality can be implemented.

The pattern image is not limited to lattice patterns, and may be checkers or concentric circle patterns. Needless to say, a plurality of types of pattern images can be combined and used.

DMD (Digital Micro-mirror Device, registered trademark of Texas Instruments) constituted by many micro-mirrors may be used for a spatial modulation element. DMD, of which drive frequency is high, about 720 Hz, can further decrease color breaking.

If a laser is used for the light source, it is preferable that the spatial modulation element 6 of the projector 22 is small, and the focal length of the projection lens 7 is short and the diaphragm stop is high. For example, when the pixel pitch of the spatial modulation element 6 is 5 µm, the focal length of the projection lens 7 is 6 mm, the diaphragm stop of the projection lens 7 is 2, and the distance between the projector 22 and the projection target is 500 mm, the depth of field is 142 mm if the permissible circle of confusion is 1 pixel. The depth of field of the projection lens 7 becomes deeper as the focal length becomes shorter and as the diaphram is more closed. If the depth of field is deep, a pattern image with less blur can be captured even if the projection target has bumps. Hence the accuracy of the image correction can be increased and the main image with high image quality can be provided. The size of the projection lens 7 increases in proportion to the size of the spatial modulation element 6 if the diaphragm stop and the angle of view of the projector 22 are the same. This means that if the size of the spatial modulation element 6 is small, the size of the projection lens 7 can be decreased, and a more compact projector 22 can be implemented. Since a laser is used for the light source, the diaphragm stop of the illumination light can be increased even if the spatial modulation element 6 is small. Because the laser is close to an ideal point light source, and etendue (product of area of light source and divergent solid angle of light) is small, it is easy to be condensed or be transformed to be substantially parallel light. If the laser is used for the light source, the diaphragm stop of the illumination light can be increased, so design of the projection lens 7 becomes easy, and a low cost projector 22 can be implemented.

As the present embodiment shows, it is preferable to use a laser light source for the light source of the present invention.

If a laser light source is used, the time division image display system can be implemented by the ON/OFF of the light source, and a projector at low cost can be implemented. Since the light source itself is small, a compact projector can be implemented. Furthermore the laser light source, which has a narrow spectrum width, excels in color reproducibility, and color correction of the main image can be easily performed on the projection target.

An LED may be used for the light source of the projector 22. In the case of an LED, the unit price is lower than a laser, so a projector 22 at lower cost than one using a laser light source can be implemented.

If an LED is used for the light source, the time division image display system can be implemented by the ON/OFF of the light source, so a color wheel, which is required for the lamp light source, can be omitted, and a projector at low cost can be implemented. Since the light source itself is small, a compact projector can be implemented.

Embodiment 2

A projector according to Embodiment 2 of the present invention will now be described with reference to FIG. 8 to FIG. 11.

The basic configuration of the projector 90 according to the present embodiment is the same as the projector 22 according to Embodiment 1 shown in FIG. 1, so composing elements are denoted with same reference symbols, and detailed description thereof is omitted.

In the present embodiment, a uniform image is used for the correction image, instead of the lattice pattern image of Embodiment 1.

FIG. 8 shows a timing to project uniform image A as the correction image of the present embodiment, and a timing for the imaging element 40 to capture the uniform image A.

Uniform image A is an image of which brightness is uniform, generated by light in which a red laser light, green laser light and blue laser light are superimposed. The laser output power ratio of the red laser light source 1R, green laser light source 1G and blue laser light source 1B is set so that white light can be generated when these colors of laser lights are superimposed. The white light is normally expressed by black body radiation temperature. For the method for setting the laser output ratio, the same method as Embodiment 1 can be used, therefore description thereof is omitted.

In the present embodiment as well, if an image other than the main image is time-integrated based on the control of the image correction controller (display control unit) 41 shown in FIG. 1, the correction image signal for projecting the correction image that is visually recognized as a uniform white or gray screen is inserted between cyclic main image signals.

Since uniform image A is a single white light image, the user does not recognize the change of color of the main image, even if uniform image A is projected between a set of main images constituted by R, G and B and the next set of main images constituted by R, G and B. If the projected uniform image A is captured and the color and brightness are known, the reflectance on the projection target surface to be a screen according to the wavelength of the entered light is discovered.

If the pattern image is used for the correction image, the reflectance of the projection target to be the screen can be easily discovered.

Figure 9:
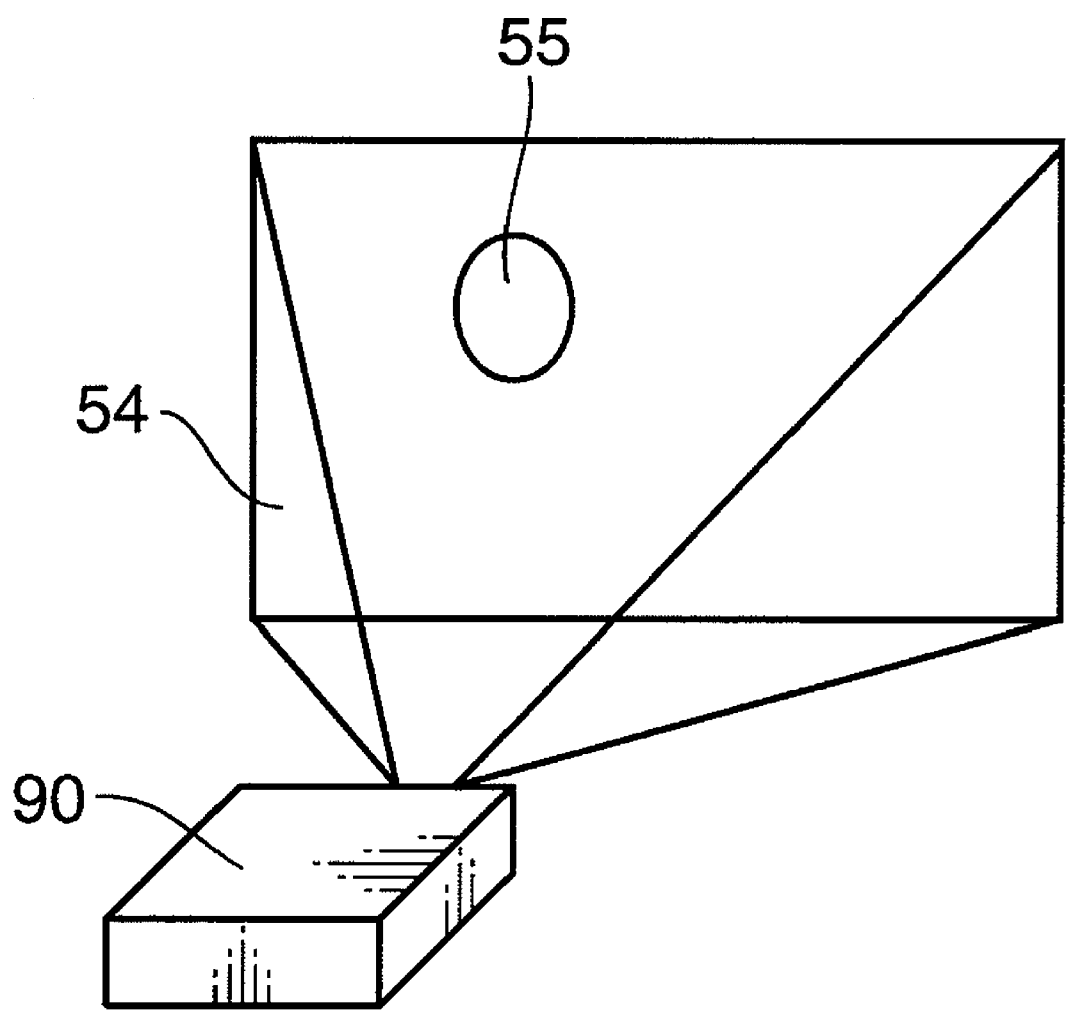
FIG. 9 is a diagram depicting a state of projecting a uniform image onto a projection target of which reflectance is partially different.

FIG. 9 is a diagram depicting a state of projecting a uniform image 54 onto a projection target having a portion where the reflectance is different. The area 55 is an area where the reflectance of the laser light having around a 532 nm wavelength is low. In other words, the area 55 is an area where the reflectance o green laser light is low. If the projected uniform image 54 is captured, the area 55 becomes purple, that is a complementary color of green. Therefore the reflectance can be specified based on the captured image. Using this reflectance, the image correction controller 41 (FIG. 1) corrects the color of the image, and increases the green component of the main image to be projected onto the area 55. This way, a main image with high image quality can be obtained with minimum deterioration of image quality due to the difference of reflectance on the projection target surface.

The brightness of the main image may be corrected according to the brightness on the projection target surface. In this case, distribution of the quantity of light that returns from the projection target surface to the user' eyes can be discovered based on the brightness distribution of the captured uniform image A. The main image is corrected according to the brightness distribution of the captured uniform image. For example, the area in which the brightness of the captured uniform image is low is recognized as a dark area to the user, since the quantity of light that reflects back to the eyes of the user is low. The image correction controller 41 corrects the image such that the brightness of the main image to be projected onto the area is increased. Thereby the user can observe a main image having a uniform brightness, even if the reflection direction of the light on the projection target surface and the degree of scattering of the light are different depending on the area.

Figure 10A:
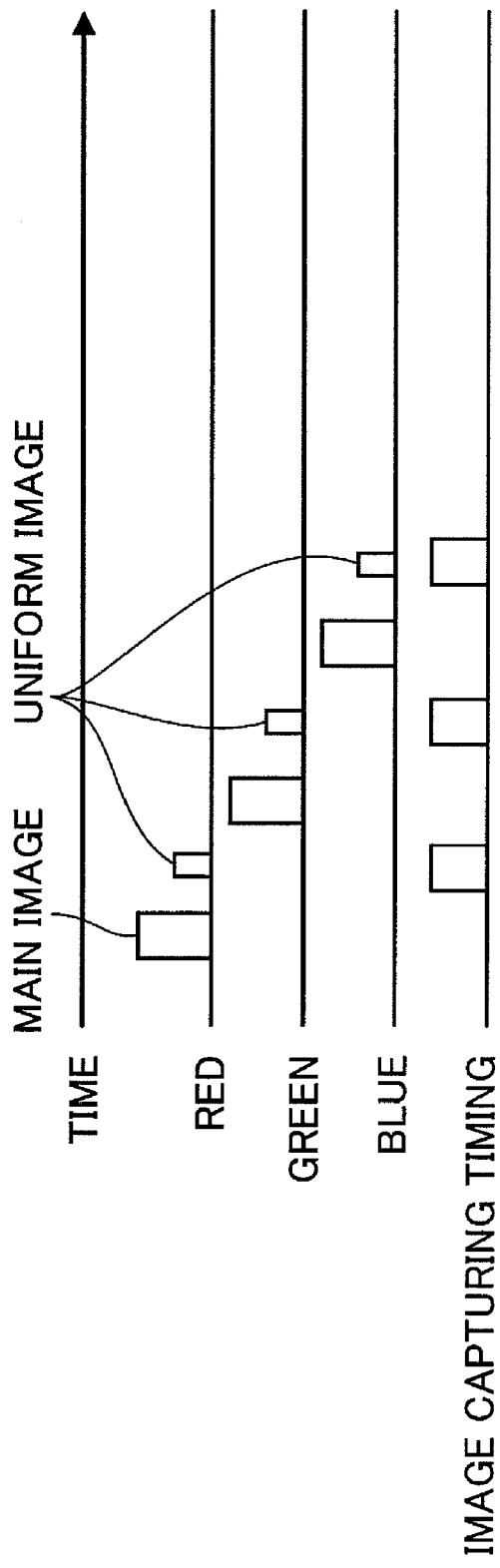
FIG. 10A is a diagram depicting an example of an insertion timing of a main image signal of each color, insertion timing of a correction image signal, and timing to capture the correction image according to another embodiment of the present invention.
Figure 10B:
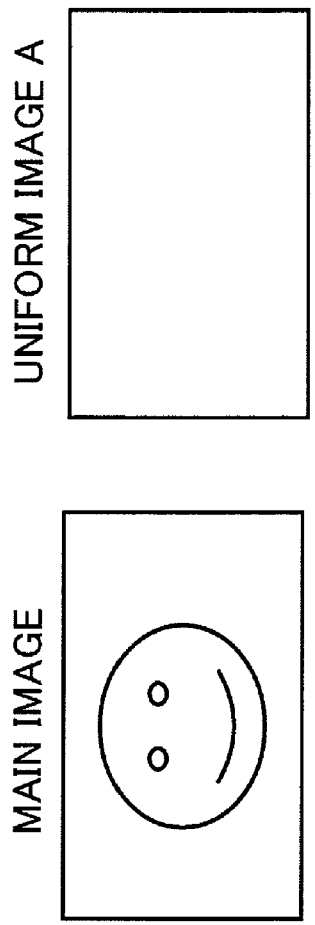
FIG. 10B is a diagram depicting an example of the main image and correction images of FIG. 10A.

If a spatial modulation element, that can perform high-speed modulation, is used for the spatial modulation element 6, the uniform image A may be each color image that is projected in time division. FIG. 10A shows a case when the uniform image A is constituted by a red image, green image and blue image that are sequentially projected in a time division system. As FIG. 10A shows, after the main image signal of each color R, G and B constituting the main image is projected, the correction image signal of each color R, G and B constituting the uniform image A is inserted.

In the present embodiment as well, just like Embodiment 1, the imaging element 40 captures only the correction image synchronizing with the projection timing of the correction image.

Just like the case of Embodiment 1, the imaging element 40 according to the present embodiment does not have to have a function to capture color images. In this case, the reflectance according to the wavelength of the entering light can be specified using only a degree of brightness of the captured uniform image A. By using an imaging element without a color image capturing function, the cost of the projector can be decreased.

Figure 11:
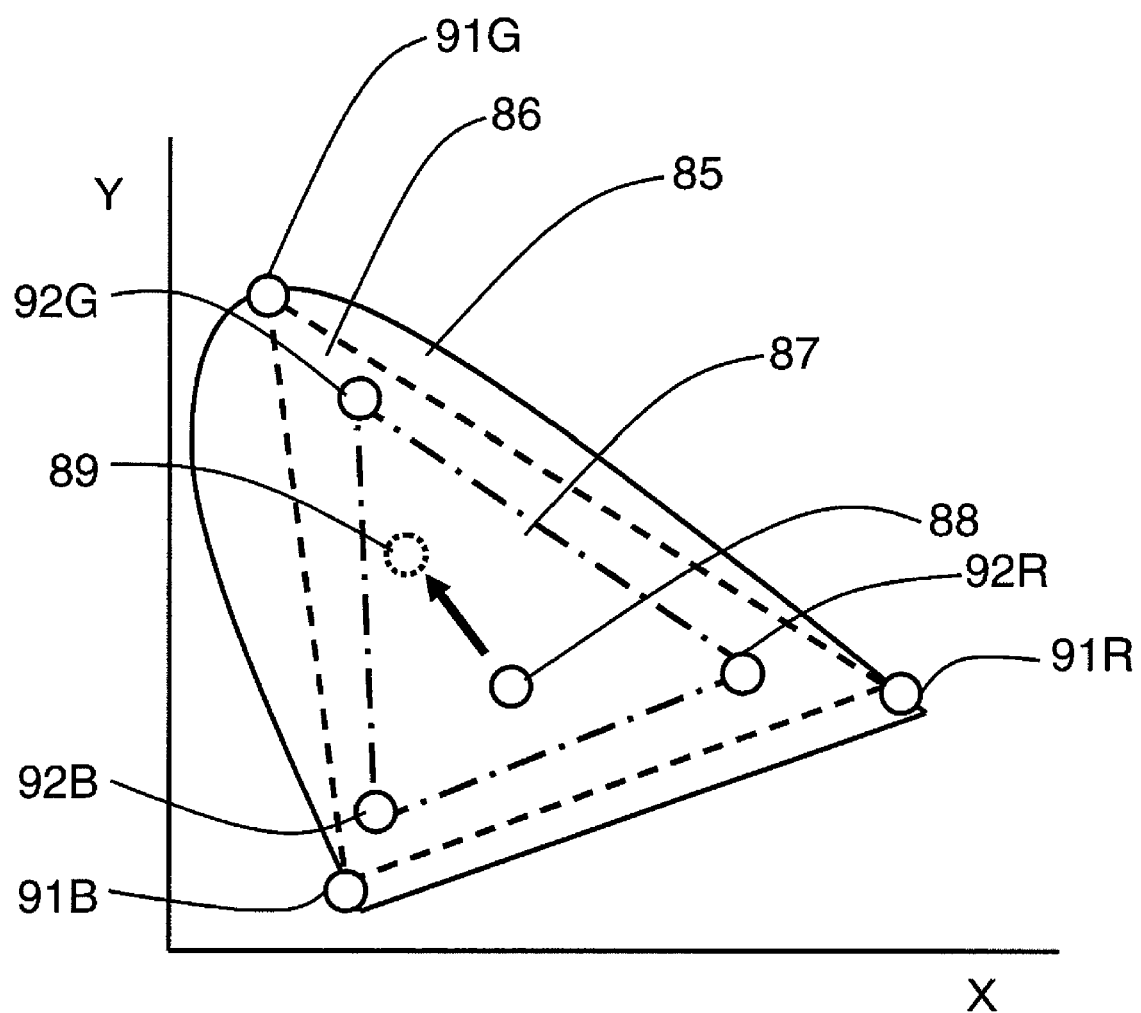
FIG. 11 is a diagram depicting a comparison of a color reproduction range of a laser light source and a color reproduction range of an LED.

For the light source according to the present embodiment, it is preferable to use a laser of which spectrum width is narrow, such as a semiconductor laser. A semiconductor laser, which has a narrow spectrum width, has a wider color reproduction range, compared with a lamp and an LED. FIG. 11 is a diagram depicting color reproduction ranges of a laser light source and LED. FIG. 11 is a chromatic diagram represented by the color coordinate x and the color coordinate y, and area 85 is a visible area. The color coordinate 91R is a color coordinate of a red laser light, the color coordinate 91G is a color coordinate of a green laser light, and the color coordinate 91B is a color coordinate of a blue laser light. The color coordinate 92R is a color coordinate of a red LED light, the color coordinate 92G is a color coordinate of a green LED light, and the color coordinate 92B is a color coordinate of a blue LED light. The area 86 is a color reproduction range area when a red laser light source, green laser light source and blue laser light source are used for the light sources, and the area 87 is a color reproduction range area when a red LED, green LED and blue LED are used for the light sources. For example, it is assumed that the color coordinate of an image of the main image signal is the color coordinate 89 in FIG. 11, and a color of the captured image is the color coordinate 88 according to the characteristics of the reflectance on the projection target surface. In order to make the color coordinate 89 of the main image and the color coordinate 88 of the image to be captured the same, the green light must be enhanced. Since the color coordinate 91G of the green laser light is more distant from the color coordinate 88 than the color coordinate 92G of the green LED light, the green laser light can change the color coordinate 88 to the color coordinate 89 with a lower power than the green LED light. By this configuration, the color correction of the main image can be performed at low power consumption. A projector having wide color reproduction can also be implemented.

Embodiment 3

A projector according to Embodiment 3 of the present invention will now be described with reference to FIG. 12 and FIG. 13.

The basic configuration of each projector according to the present embodiment is the same as the projector 22 according to Embodiment 1 in FIG. 1. Therefore composing elements the same as Embodiment 1 are denoted with the same reference symbols, for which detailed description is omitted.

In the present embodiment as well, if the image, other than the main image, is time-integrated based on control of the image correction controller (display control unit) 41 shown in FIG. 1, the correction image signal for projecting the correction image, that is visually recognized as a uniform white or gray screen, is inserted between cyclic main image signals, but in the present embodiment, this correction image is a two-dimensional code image, which can include various information. In other words, the difference of the present embodiment from the above mentioned embodiments is that a pattern image, constituted by two-dimensional code image A and two-dimensional code image B, is used for the correction image.

Figure 12B:
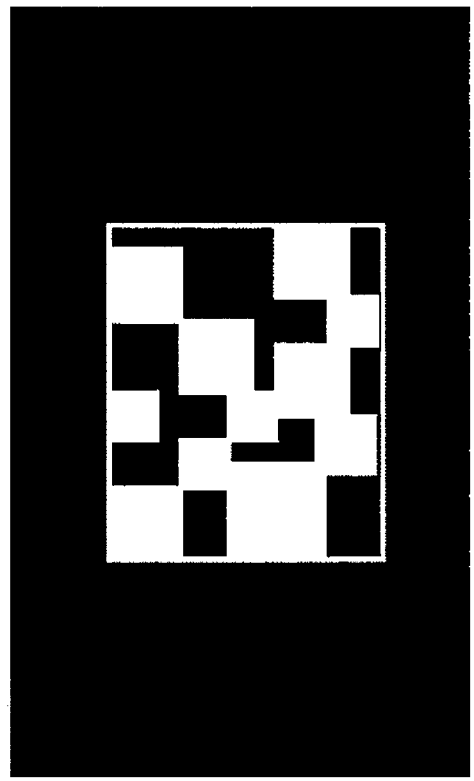
FIG. 12B is a diagram depicting a case when the correction image to be projected is a two-dimensional code image.
Figure 12A:
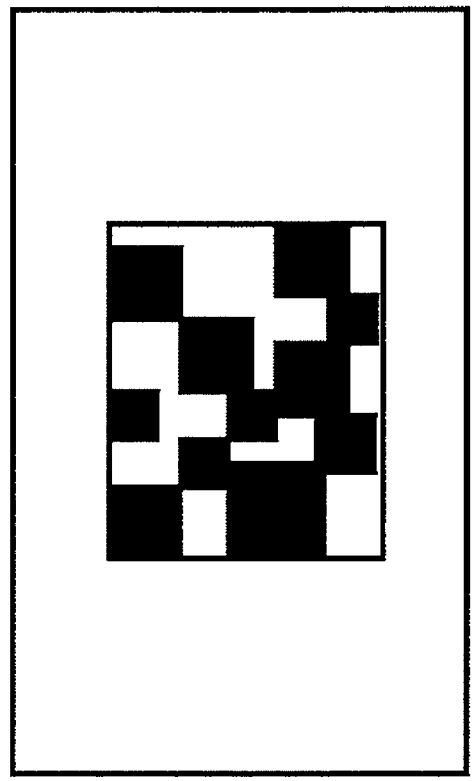
FIG. 12A is a diagram depicting a case when the correction image to be projected is a two-dimensional code image.

FIG. 12A shows two-dimensional code image A as a correction image and information image. FIG. 12B shows two-dimensional code image B as a correction image in which brightness of the two-dimensional code A is inverted. If the two-dimensional code image A and two-dimensional code B are time-integrated, they are recognized as a uniform white or gray screen, so the user can observe the main image without recognizing the two-dimensional codes.

The imaging element 40 according to the present embodiment captures the two-dimensional code image A synchronizing with each projection timing. Thereby the inserted two-dimensional code A can be acquired and information included in the two-dimensional code image A can be acquired while the main image signal is projected. Thus if the two-dimensional code image A having information is used, more information can be provided compared with the method for modulating the illumination light in time and transmitting information.

In the present embodiment, the image correction controller 41 (FIG. 1) has a function as an analysis unit to extract information from a two-dimensional code captured by the imaging element 40.

The imaging element 40 may capture the two-dimensional code image A and the two-dimensional code image B synchronizing with the projection timing thereof, just like the configuration in FIG. 2A. In this case, the two-dimensional code image A can be used for acquiring information and correcting the main image, and the two-dimensional code image B can be used for correcting the main image. Or the two-dimensional code image A may be used only for acquiring information, and the two-dimensional code image B may be used for correcting the main image.

Each correction image signal of the two-dimensional image A may be sequentially inserted after each main image signal for sequentially projecting the (R) image, (G) image and (B) image constituting the main image, just like FIG. 4A, or may be inserted simultaneously after each main image signal for sequentially projecting the (R) image, (G) image and (B) image constituting the main image, just like FIG. 2A.

The two-dimensional code image A and the two-dimensional code image B may be combined with other correction images, such as inserting the pattern image A and pattern image B having lattice patterns between the main images, and projecting them after inserting the two-dimensional code image A and the two-dimensional code image B between the main images, and projecting them. Thereby the information can be transferred to the user by the two-dimensional code, and at the same time, the main images can be appropriately corrected according to the projection target surface that constantly changes while projecting a correction image (e.g. lattice pattern image, uniform image) suitable for correcting the color and form of the projection target surface.

If both the two-dimensional code and another correction image are inserted between the main images, the insertion frequency of the two-dimensional code may be set to be lower than the insertion frequency of the other correction image. This is because the two-dimensional code, mainly for transferring information, can implement the information transfer function sufficiently even if it is inserted with several seconds of interval, and does not need the insertion frequency required for the other correction image that is inserted for correcting the main image following up the projection target surface that changes constantly. If the two-dimensional code is constituted by the two-dimensional code image A and the two-dimensional code image B, as mentioned above, the pair of two-dimensional codes A and B should be inserted between the main images closely together in time, so that the user does not visually recognize these as two-dimensional codes.

The projector according to the present embodiment may have a synchronization signal generation device, synchronization signal transmission device and synchronization signal reception device. FIG. 13 shows a state when a plurality of users are using projectors according to the present embodiment.

When a plurality of individuals use projectors, the main image may be projected for each other. The projected image may be individually generated, and information on the individual who acquired the image, and time and place of the acquisition, may be demanded.

According to the present embodiment, a plurality of projectors 25 and 26 has a signal transmission/reception unit 29X or 29Y which transmits/receives the synchronization signal 27 to indicate the timing to project the two-dimensional code image, and the timing to project the two-dimensional code image is synchronized using the synchronization signal 27.

When a user X, who uses the projector 25, directs their projector 25 to the image 28 which is being projected by the user Y, who uses the projector 26, the signal transmission reception unit 29X of the projector 25 receives the synchronization signal 27 from the signal transmission/reception unit 29Y of the projector 26 of user Y, so that only the correction image of the two-dimensional code can be captured. Therefore the user X and the user Y can acquire data on the image that the other user projects for each other.

Therefore when a plurality of projectors are used, a timing of projecting the correction image of each projector can be synchronized, and only the correction image of the other projector that is projecting an image can be captured and acquired.

Embodiment 4

Figure 14:
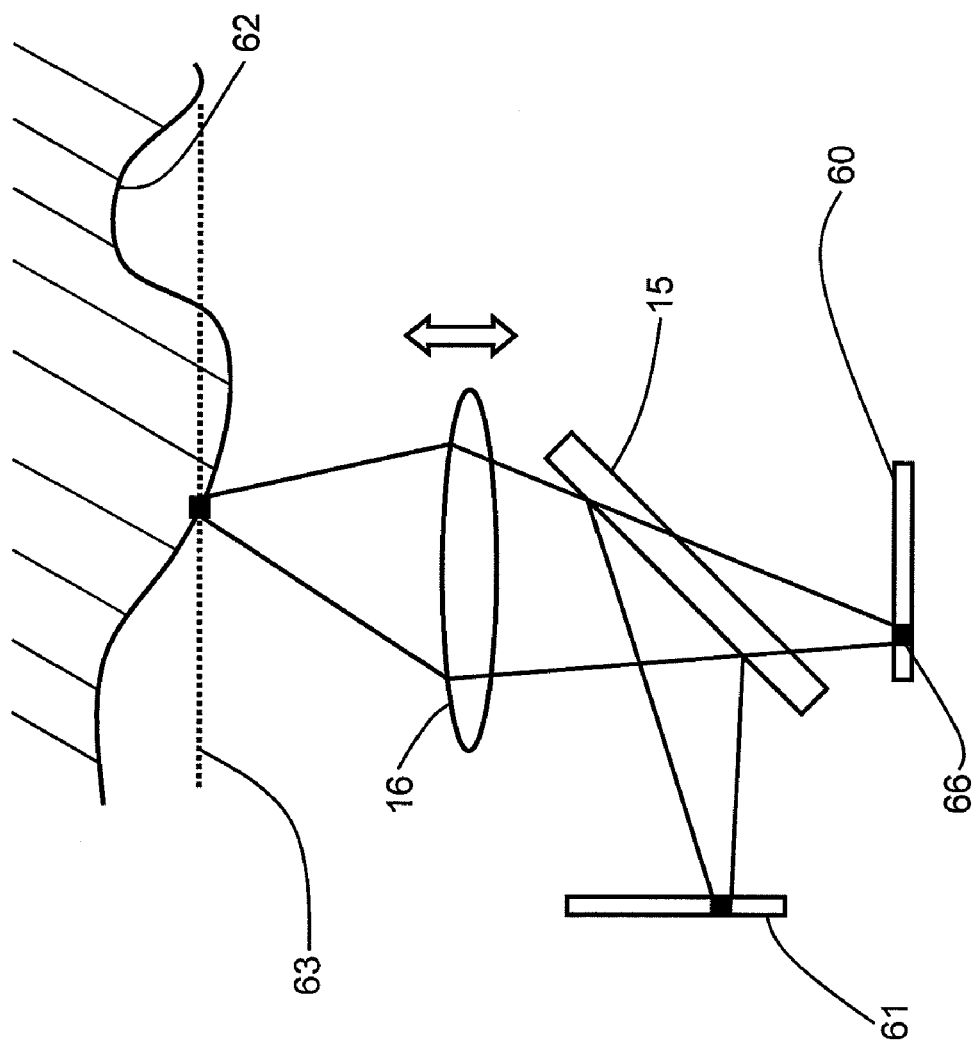
FIG. 14 is a diagram depicting a configuration when a projection lens of the projection optical system also functions as an imaging lens of the imaging optical system.

A projector according to Embodiment 4 of the present invention will now be described with reference to FIG. 14.

The projector according to the present embodiment has a lens actuator (not illustrated) for driving the projection lens 7, in addition to the projection optical system and imaging optical system of the projector 22 according to Embodiment 1. As FIG. 14 shows, this projector has a half mirror 15 and a projection imaging lens 16 that functions as both a projection lens and imaging lens. The light 66 for 1 pixel that is output from the spatial modulation element 60 passes through the half mirror 15, and is projected onto a projection target surface 62 having bumps, by the projection imaging lens 16 that functions as both a projection lens and imaging lens. In FIG. 14, the reference number 63 shows an image forming plane on which the spatial modulation element 60 forms an image by the projection imaging lens 16. The light 66 for 1 pixel that is output from the spatial modulation element 60 forms an image on the projection target surface 62. Meanwhile, the light reflected from the projection target surface 62 forms an image in the imaging element 61.

The projection target surface 62 has bumps. Therefore the image formed on a surface that does not match the image forming plane 63 becomes a blur. If the projection imaging lens 16 is shifted by the lens actuator (not illustrated) in the optical axis direction (arrow direction in FIG. 14), the image forming plane changes in the arrow direction. Therefore according to the present embodiment, the image correction controller 41 (FIG. 1) recognizes the bumps on the projection target surface 62 from the shift amount of the projection imaging lens 16 and the pixels where the image is formed at this time, and image processing is performed according to the bumps of the projection target surface 62. For example, the projection imaging lens 16 is shifted so that the convex portion on the projection target surface 62 becomes the image forming plane of the projection imaging lens 16. And according to the blur of the pixels in the concave portion of the projection target surface 62, resolution of the main image to be projected to the convex portion is decreased. Thereby an image with uniform resolution can be provided, regardless the bumps of the projection target surface. According to the present embodiment, the projection lens also functions as an imaging lens, so compactness and lower cost can be implemented, and a compact projector with low power consumption can be provided.

Figure 15B:
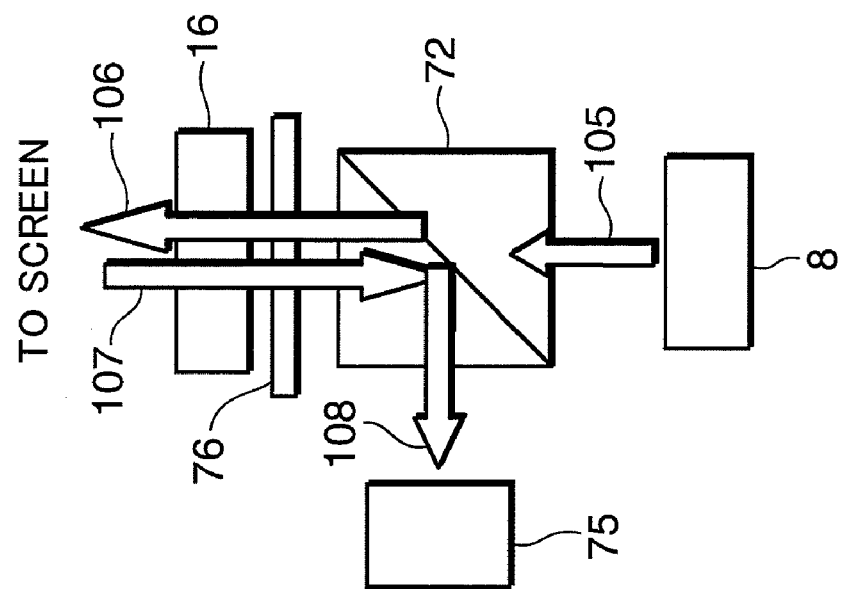
FIG. 15B is a diagram depicting a polarized beam splitter used for the configuration shown in FIG. 14 as an example.

In the configuration according to the present embodiment, a polarized beam splitter 72, shown in FIG. 15B, may be used instead of the half mirror 15.

Figure 15A:
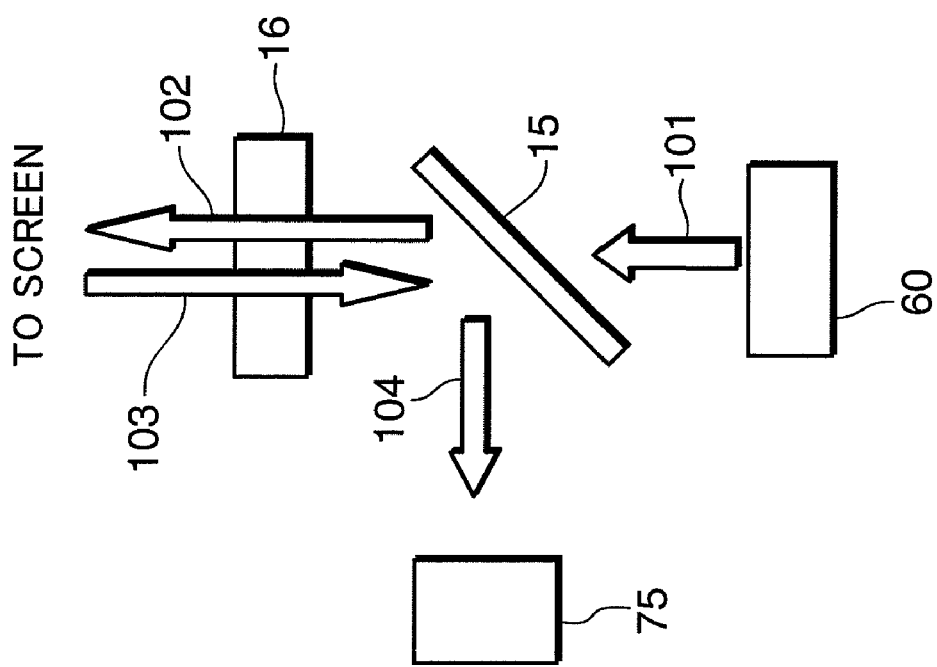
FIG. 15A is a diagram depicting a case when a half mirror is used for the configuration shown in FIG. 14, for example.

FIG. 15A and FIG. 15B show general configurations in the case of using the half mirror 15 and in the case of using the polarized beam splitter 72 respectively. FIG. 15A is a block diagram which includes the half mirror 15, and FIG. 15B is a block diagram which includes the polarized beam splitter 72.

The half mirror 15 is a semi-transmission mirror that transmits light 50% and reflects light 50%. So every time light is transmitted through or reflected by the half mirror 15, the light intensity drops 50%. In FIG. 15A, the light 101 emitted from the spatial modulation element 60 transmits 50% through the half mirrors 15, and becomes the light 102. The light 102 is projected onto the screen by the projection imaging lens 16. The light 103 reflected from the screen passes through the projection imaging lens 16, is reflected 50% by the half mirror 15, becomes the light 104, and is captured by the imaging element 75. The configuration using the polarized beam splitter 72 shown in FIG. 15B, on the other hand, has a ¼ wavelength plate 76. In this case, it is preferable that a liquid crystal display element 8, for controlling the polarization of the light, is used for the spatial modulation element. The ¼ wavelength plate 76 is for generating a 90° phase difference, and if the lag axis is set to 45° with respect to the linearly polarized light, a circularly polarized light can be obtained. The liquid crystal display element 8 is for modulating light by controlling the polarization. The polarized beam splitter 72 splits the light into transmission and reflection according to the polarization, and light can transmit through the polarized beam splitter 72 without dropping the light intensity by aligning the polarized lights of the polarized beam splitter 72 and the liquid crystal display element 8 in the transmitting direction.

The linearly polarized light 105 emitted from the liquid crystal display element 8 transmits through the polarized beam splitter 72, is transformed to be a circularly polarized light 106 by the ¼ wavelength plate 76, and is projected onto the screen by the projection imaging lens 16. The circularly polarized light 107 reflected from the screen passes through the projection imaging lens 16, and is transformed to be a linearly polarized light 108 by the ¼ wavelength plate 76. Since the polarizing direction of the linearly polarized light 108 is perpendicular to that of the linearly polarized light 105, the linearly polarized light 108 is reflected by the polarized beam splitter 72, and is captured by the imaging element 75.

Compared with the configuration of using the half mirror 15 in FIG. 15A, light utilization efficiency for the image to be projected and light utilization efficiency for the image to be captured can be increased in the configuration of using the liquid crystal display element 8, polarized beam splitter 72 and ¼ wavelength plate 76 in FIG. 15B. Since the light utilization efficiency for the image to be projected is high, a projector with low power consumption can be provided. Also since the light utilization efficiency for the image to be captured is high, a high resolution image can be captured with a short exposure time of the imaging element.

In other words, the optical system can be more compact by the above configuration, so the projector can be downsized. Furthermore, the polarized light can be efficiently used, so light utilization efficiency can be increased, and a projector with low power consumption can be implemented.

Figure 16:
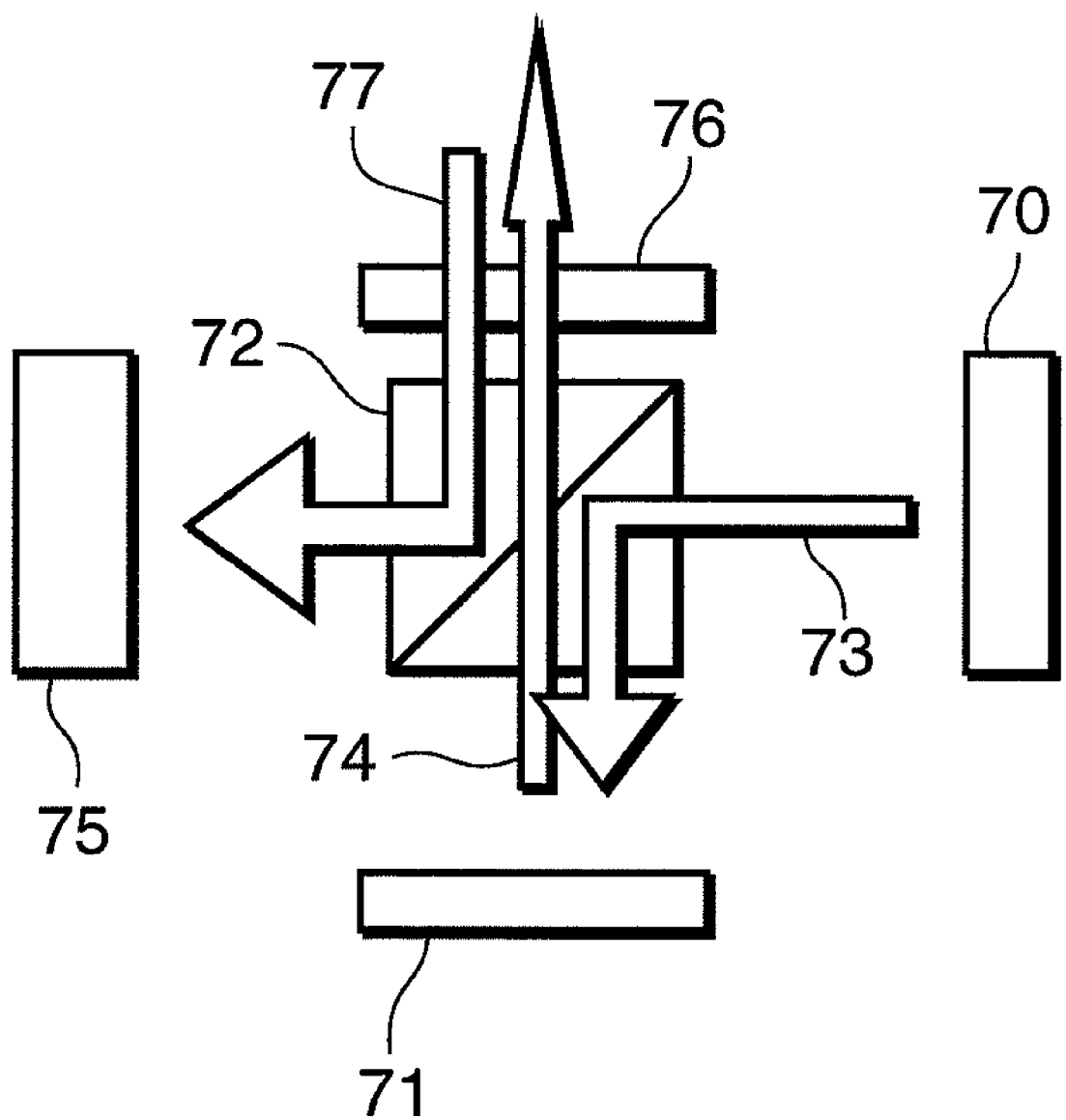
FIG. 16 is a diagram depicting an optical system using a reflection type LCOS and the polarized beam splitter.

To decrease the power consumption of the projector, the reflection type LCOS (Liquid Crystal On Silicon) 71 may be used for the spatial modulation element. Compared with the transmission type liquid crystal display element, the light utilization efficiency can be increased if the reflection type LCOS 71 is used. This is because in the case of a transmission type liquid crystal display element, matrix wiring called "black matrix" is included in the light transmission area of the liquid crystal display element, which decreases the numerical aperture. But in the case of a reflection type LCOS, wiring can be created on the back of the reflection surface, that is the display surface, which increases the numerical aperture. FIG. 16 is a diagram depicting a configuration example when the reflection type LCOS 71 is used. Since the reflection type LCOS 71 uses the polarized beam splitter 72 in the configuration, it is unnecessary to provide a new polarized beam splitter 72. The linearly polarized light 73 that is emitted from the light source 70 is reflected by the polarized beam splitter 72, and the reflection type LCOS 71 shifts the polarizing direction of an arbitrary pixel by 90°, and reflects it. The reflected light 74 of which polarization turned 90° transmits through the polarized beam splitter 72, is transformed into circularly polarized light by the ¼ wavelength plate 76, and the image is projected onto the screen. By disposing the imaging element 75 in a position shown in FIG. 16, the light reflected from the screen is transformed into linearly polarized light by the ¼ wavelength plate 76, is reflected by the polarized beam splitter 72, and enters the imaging element 75. If such a configuration is used, a projector with high light utilization efficiency and low power consumption can be provided.

If the reflection type LCOS 71 is used for the spatial modulation element, it is preferable that a light source that emits a single polarized light, such as a semiconductor laser, is used for the light source 70. The reflection type LCOS 71 modulates the light by controlling the light polarization direction according to the image signal. For this, lights that enter the reflection type LCOS 71 must be linearly polarized lights of which polarization is aligned. In general, in the case of light having random polarization, the projection optical system allows light to transmit through the polarization filter so as to align in the polarization direction, and cut components other than appropriate polarized light components. The laser light can emit linearly polarized light of which polarization is aligned, so a polarization filter for aligning polarization becomes unnecessary, and light utilization efficiency can be increased.

Embodiment 5

Figure 18:
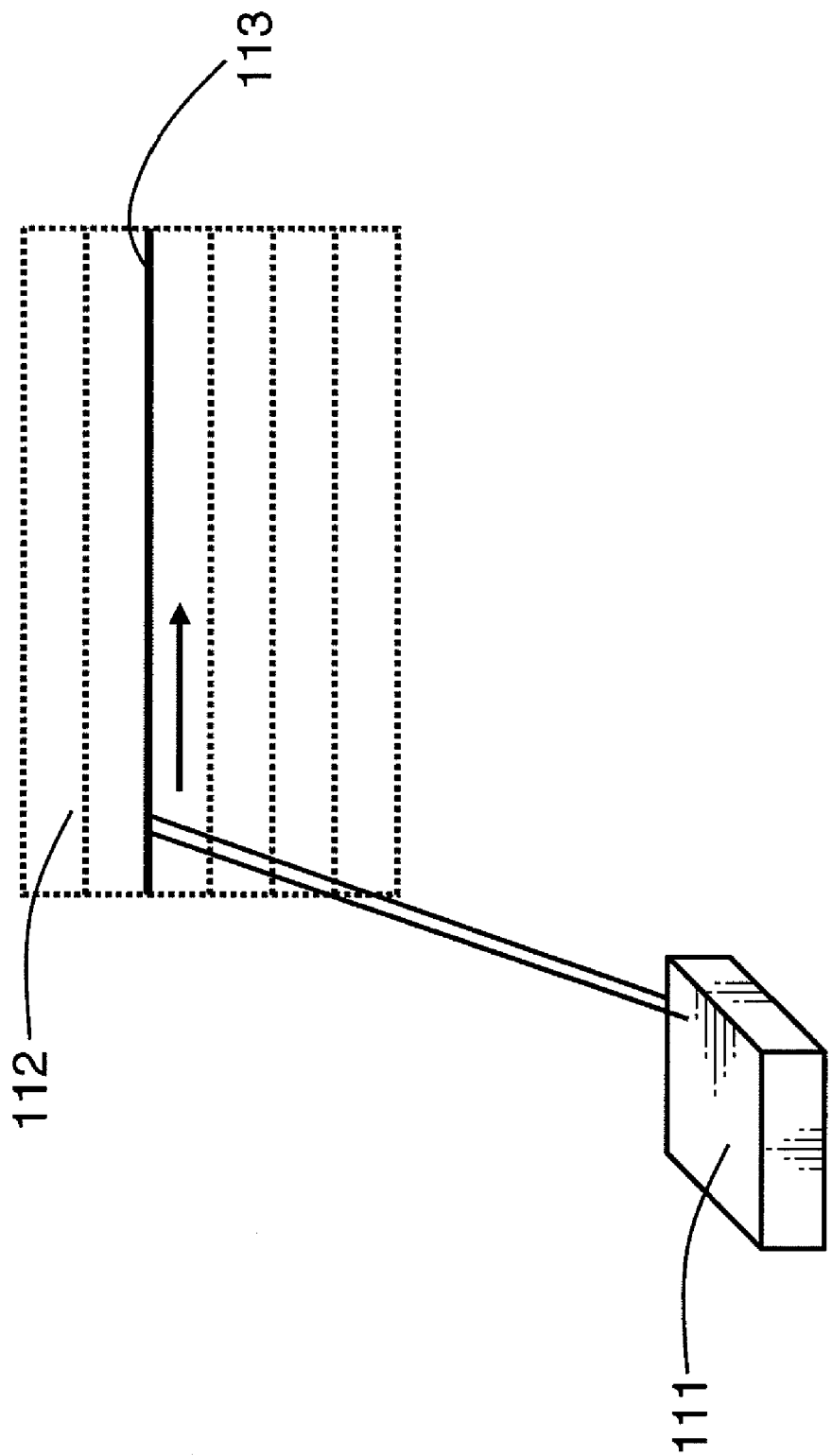
FIG. 18 is a diagram depicting a pattern image to be scanned and a pattern image to be captured.
Figure 19:
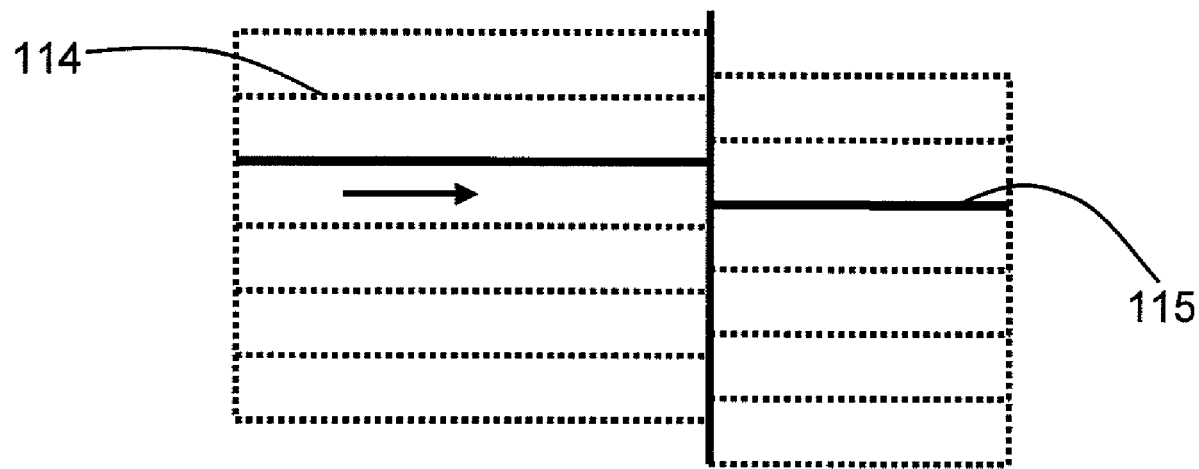
FIG. 19 is a diagram depicting a pattern image to be scanned and a pattern image to be captured.

A projector according to Embodiment 5 of the present invention will now be described with reference to FIG. 17 to FIG. 19.

The difference of the projector according to the present embodiment from the above mentioned embodiments is that a scanning type projection system is used. The other configuration is the same as the projector 22 according to Embodiment 1.

Figure 17:
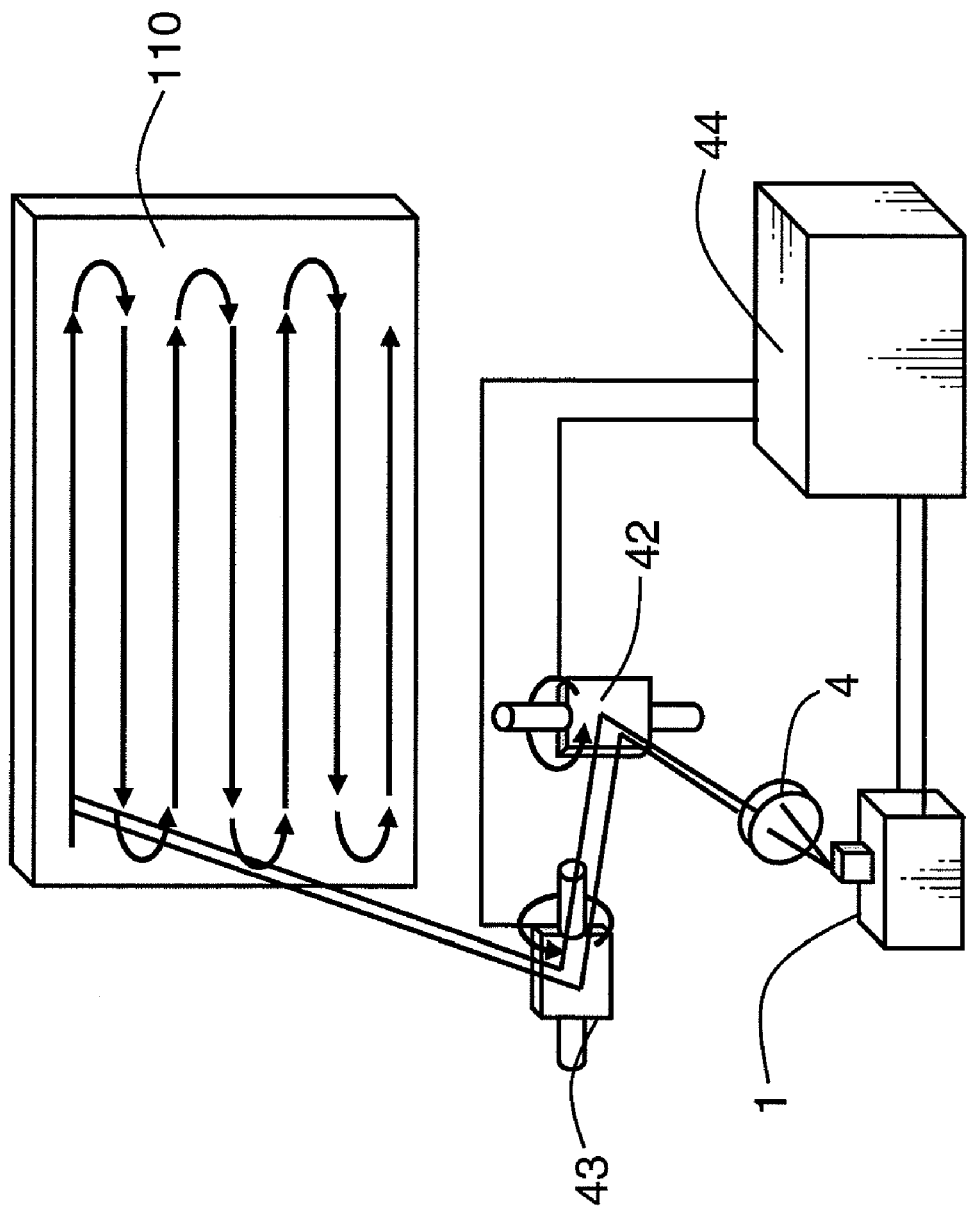
FIG. 17 is a diagram depicting a scanning type projection system.

FIG. 17 is a diagram depicting the scanning type projection system. As FIG. 17 shows, the projector according to the present embodiment has a laser light source 1, collimator lens 4, first scanning mirror 42, second scanning mirror 43 and image control unit 44. The beam emitted from the laser light source 1 becomes substantially parallel light by the collimator lens 4, and is projected onto the screen 110 by the first scanning mirror 42 and the second scanning mirror 43. The image control unit 44 modulates the power of the laser light source 1 in each pixel according to the signal of the main image. The speed to scan the substantially parallel light is sufficiency faster than the time resolution of human eyes, so the user recognizes the projected light as a two-dimensional image.

In such a scanning type projection system, a substantially parallel light beam is scanned so a pattern image with less blur can be projected even if the screen 110 has bumps. Therefore the accuracy of image correction can be improved and a main image with high image quality can be provided.

The imaging unit 111 synchronizes with the scanning unit, and the shutter speed of the imaging element 40 may be slower than the shutter speed to capture an entire pattern image. FIG. 18 shows a state of capturing a part of the scanned pattern image. In FIG. 18, the dotted line shows a correction pattern image 112 to be scanned, and the solid line shows the captured pattern image 113. As FIG. 18 shows, the pattern image 112 is a stripe pattern, and the imaging unit 111 captures one line of the stripe pattern. FIG. 19 shows the case when the projection target to be the screen has bumps. When the projection target (not illustrated) to be a screen has bumps, the dotted line in FIG. 19 is a pattern image 114 to be scanned, and the solid line is a pattern image 115 to be captured. The captured pattern image 115 is only one line of the stripe pattern of the pattern image 114 to be scanned, so even the stripe pattern of the captured pattern image 115 is discontinuous, as shown in FIG. 19, and bumps on the projection target to be a screen can be easily recognized. Therefore the main image can be corrected accurately, and a main image with higher image quality can be provided.

Embodiment 6

A projector according to Embodiment 6 of the present invention will now be described with reference to FIG. 20A and FIG. 20B.

The projector 120 according to the present embodiment basically has the same configuration as the projector 22 according to Embodiment 1 shown in FIG. 1. Therefore composing elements the same as Embodiment 1 are denoted with the same reference symbols, for which detailed description is omitted.

The difference of the projector according to the present embodiment from the above mentioned embodiments is that the present embodiment has an image correction function, including a prediction control. Image correction is performed on the main image to be projected using frame data of the captured pattern image. In more concrete terms, the change of project target is predicted based on the difference of one previous pattern image and the second previous pattern image, and image correction is performed.

FIG. 20A and FIG. 20B show the state when the pattern image, as a correction image, changes according to the change of the relative angle of the flat projection target 121 and the projector 120. FIG. 20A shows a pattern image 123 that is captured in a state when the relative angle of the projector 120 and the projection target 121 is angle 122 (θ1). FIG. 20B shows a pattern image 133 that is captured in a state when the relative angle of the projector 120 and the projection target 121 is angle 132 (θ2). If the projector 120 turns in the arrow direction shown in FIG. 20A from the state shown in FIG. 20A, the relative angle 122 of the projector 120 and the projection target 121 increases from the angle 122 (θ1) to angle 132 (θ1). If the relative angle spreads from the angle 122 (θ1) to the angle 132 (θ2), the distortion of the pattern image to be projected increases, and the pattern to be captured becomes pattern image 133. In this way, as the relative angle of the projector 120 and the projection target 121 increases, distortion of the trapezoid increases. From the captured pattern image 123 and pattern image 133, the relative angle 122 and the relative angle 132 can be determined. For example, if the relative angle 122 is θ1 and the relative angle 132 is θ2, then θ3 is determined by the following expression.

$$\theta 3=\theta 2+(\theta 2-\theta 1)$$

Predicting that the relative angle of the next state in FIG. 20B is θ3, the main image to be displayed next is corrected. By this configuration, the main image can be corrected more quickly using the change of the captured pattern image. Hence an image with higher quality can be provided even if the relative angle and the relative position of the projector and projection target constantly change along with time.

Embodiment 7

A projector according to Embodiment 7 of the present invention will now be described.

Figure 21:
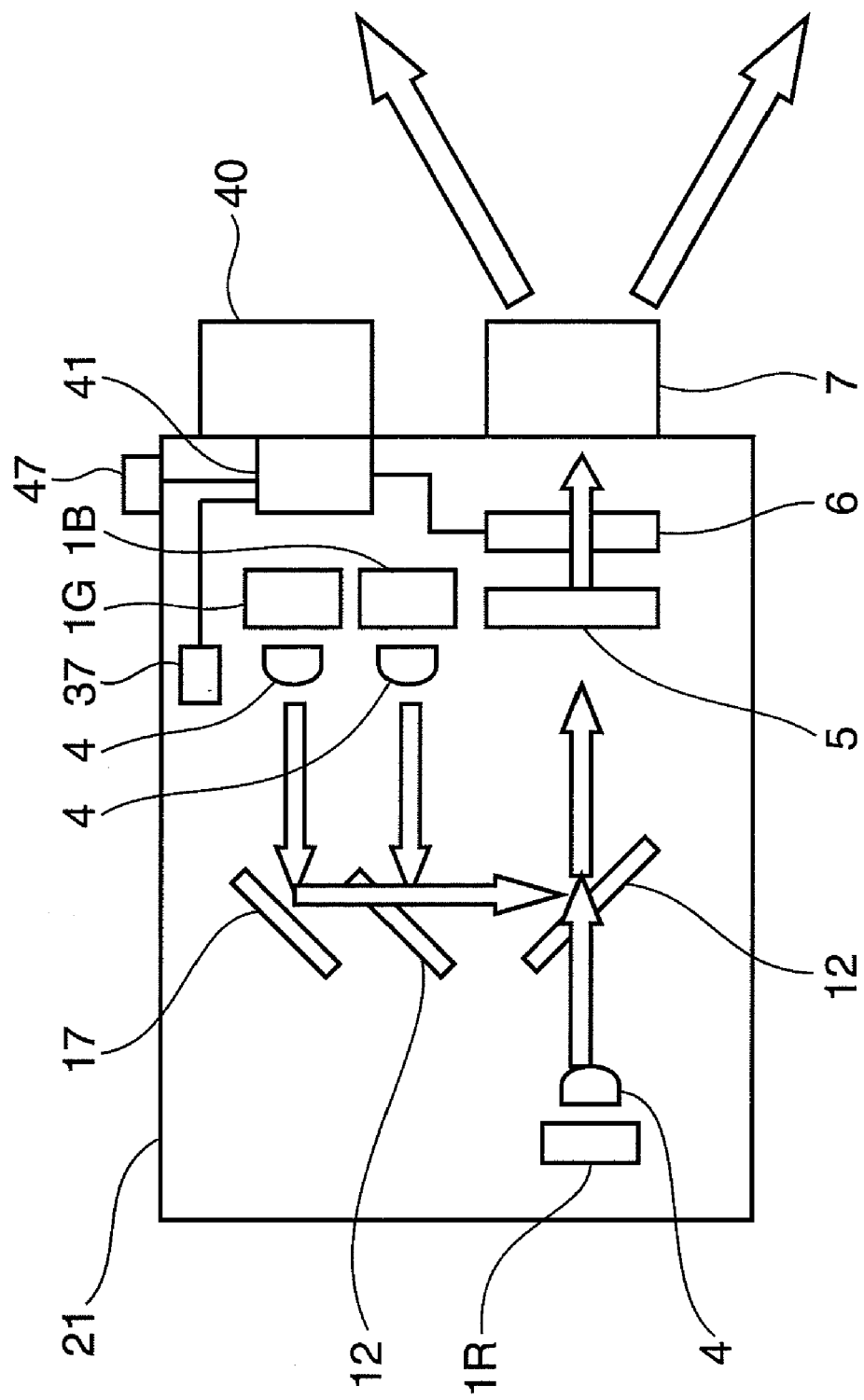
FIG. 21 is a diagram depicting a general configuration of a projector according to another embodiment of the present invention.

The projector 77 according to Embodiment 7 will be described with reference to FIG. 21.

The projector 77 has a switching information input unit 47 that switches whether a correction image signal is inserted between the above mentioned cyclic main image signals or not, and a motion sensor 37 that detects a projector, and the difference from the projector 22 shown in FIG. 1 is that an image correction controller 41 (switching unit) switches whether the correction image signal is inserted or not based on the output of the switching information input unit 47 or the motion sensor 37.

For example, in a state of the screen (not illustrated) and the projector 77 being secured, such as a case of using the projector 77 on a desk, it is not necessary to correct the main image constantly. Inserting a correction image is equivalent to inserting a gray image for the user observing the main image, so the contrast of the main image slightly drops.

Therefore if it is not necessary to constantly correct the main image because the relative positional relationship of the screen and the projector 77 is fixed, as mentioned above, the switching information input unit 47 is turned OFF, so that the correction image signal is not inserted between the above mentioned cyclic main image signals. The switching information input unit 47 may be a switch disposed on an enclosure of the projector 77, or may be a remote controller that enables control from the outside.

Because of the above configuration, a projector that can improve image quality by inserting the correction image only when necessary, with low power consumption, can be implemented.

The image correction controller 41 that functions as a switching unit may have a function to insert a correction image continuously during a predetermined period, and decides on the necessity of insertion of the correction image based on the result of comparing each correction image captured during this period. In other words, if the correction images captured during the predetermined period show no change, it is judged that the relative positional relationship between the screen and the projector 77 is not changing, and the interval until insertion of the next correction image is increased. If the correction images captured during the predetermined period changed, on the other hand, it is judged that the relative positional relationship of the screen and the projector 77 is changing, and the interval until the insertion of the next correction image is decreased. According to the configuration of the present embodiment, the insertion of the correction image can be automatically judged without the user operating the projector 77.

The projector 77 has a motion sensor 37 that detects motion of the projector 77, and the image correction controller 41, which functions as the switching unit, controls to insert the correction image signal if the motion sensor 37 detects motion, and not to insert the correction image signal if the motion sensor 37 does not detect motion.

The projector 77, which has the above configuration, can automatically decide whether the correction image is inserted or not according to the motion detection result by the motion sensor 37, so the necessity of image correction can be accurately judged, and correction images can be efficiently inserted.

An angular velocity sensor, for example, can be used as the motion sensor 37. If the projector 77 is hand held to project an image, angular velocity is generated due to hand vibration or the like. Therefore if the angular velocity sensor equipped as the motion sensor 37 detects an angular velocity by the angular velocity sensor, it is judged that the projector 77 is moving, and a correction image signal is inserted to start constantly correcting the main image.

In the case of the projector 77 equipping an angular velocity sensor for optical hand motion blur correction, this angular velocity sensor may also be used as the motion sensor 47. This motion sensor 47 is not limited to an angular velocity sensor, but other sensors that can detect motion of the projector 77, such as an acceleration sensor and geo-magnetic sensor, can be used.

Embodiment 8

FIG. 22A and FIG. 22B are diagrams depicting an example of how to use a projector according to Embodiment 8 of the present invention. The projector 22 according to the present embodiment has an imaging element, and therefore can be used not only as a projection element but as an imaging element as well.

As FIG. 22A shows, the present projector 22 has a function not only to project a pattern image 51 onto a projection target to know the form of the projection target, but also to discern a three-dimensional form of the object 50 that exists in the projection target, and a two-dimensional (plane) background 80 in the captured image. By capturing the projection target while irradiating the pattern image 51, the form of the projection object is stored, and on the other hand, the image of the projection target alone is also captured at a timing when the pattern image 51 is not projected. Since the form of the projection target can be analyzed by the image of the projection target captured while irradiating the pattern image 51, the three-dimensional form of the object 50 existing in the projection target and the two-dimensional background 51 can be discerned, and the object 50 alone can be extracted and stored. Therefore the processing to automatically remove the background 51 from the captured image, and extract the object 50 alone (trimming processing), can be performed.

For example, the projector 22 can project the image 52 of the extracted object onto another screen in a state where the background portion 24 is removed, as shown in FIG. 22B. The image 52 of the extracted object can also be combined with another image and projected.

Embodiment 9

Image display devices using three primary color laser light sources have actively been developed lately. This is because an image with good color reproducibility can be acquired by using the monochromaticity of a laser, and compact and low power consumption equipment can be implemented by using a semiconductor laser which has high electro-optical transformation efficiency, and can improve light utilization efficiency. In particular, a scanning type image display device, that forms an image by scanning with a laser light of which intensity is modulated according to the image signals, can implement an image display device with which can be further downsized and decrease power consumption, and good portability is implemented. With the operating environment of such an image display device that excels in portability in view, Patent Document 2 discloses a scanning type image display device that can correct the positional relationship of the image display device and image display target. According to Patent Document 2, the laser light for measurement is irradiated onto the image display target, and the entering angle of the reflected light to the photodetector is measured, so that the distance between the scanning type image display device and image display target and the form of the image display target are measured based on a trigonometric survey theory, and an image to be displayed can be corrected.

In a conventional scanning type image display device, however, it is recognized that the display image must be corrected according to the distance between the scanning type image display device and image display target or the form of the image display target, but the necessity of correcting the deterioration of the image due to the color irregularity of the image display target and the difference in patterns and materials thereof, with the operating environment of the image display device having good portability in view, is not considered at all. In other words, when an image is displayed on a scattering surface having various reflectances (hereafter called "projection target surface"), not a dedicated screen that has been used with a conventional projector, or when the scanning type image display device that is hand held is operated, it is easily expected that the projection target surface constantly moves. Under such a situation, the image to be projected must be adjusted based on the spectral reflectance of the project target surface. In other words, if color irregularity or a pattern exists on the projection target surface, or if the projection target surface is constituted by components made of different materials, or if a part of the projection target surface is missing, a good image can be displayed by correcting the image so as to cancel the color irregularity or pattern, or by projecting an image of which light quantity is corrected with the reflectance of each component, or by not projecting the image on the missing portion of the projection target surface. However, correction based on the spectral reflectance like this cannot be performed by a conventional scanning type image display device.

With the foregoing in view, an object of the present embodiment is to provide a compact scanning type image display device and image correction method having a function to measure the spectral reflectance of the projection target surface, and to correct the displayed image based on the spectral reflectance of the projection target surface when images are displayed on various projection target surfaces with the scanning type image display device.

Figure 23:
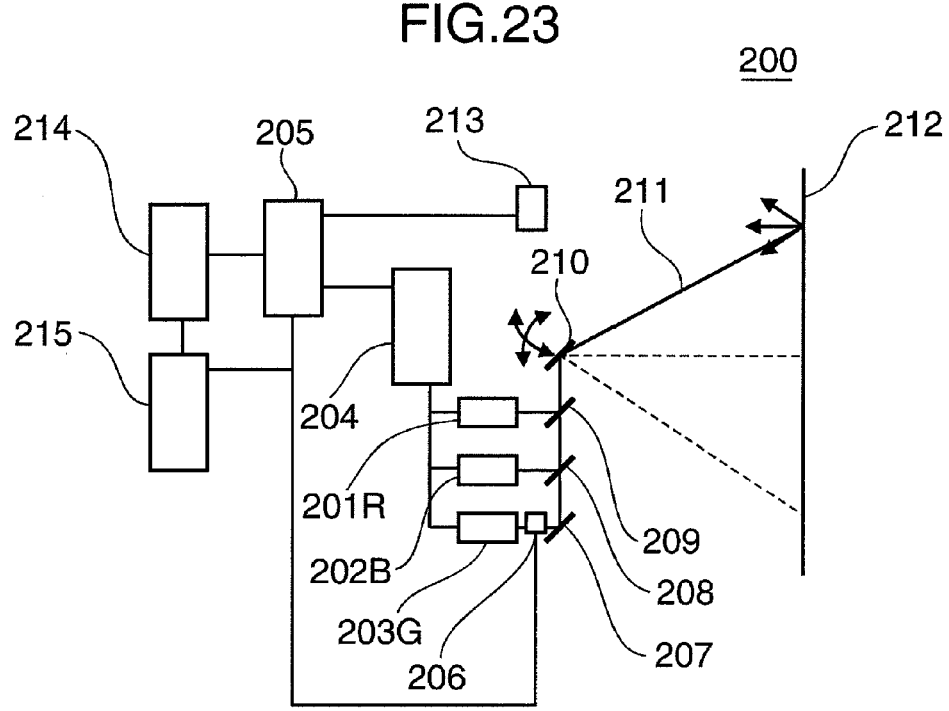
FIG. 23 is a diagram depicting a general configuration of a scanning type image display device according to an embodiment of the present invention.

FIG. 23 shows a general configuration of a scanning type image display device 200 according to Embodiment 9 of the present invention.

As FIG. 23 shows, the scanning type image display device 200 has a laser light source 201R, laser light source 202B and laser light source 203G for each color, a drive circuit 204, control unit 205, spatial modulation element 206, dichroic mirrors 207 to 209, scanning unit 210, photodetector 213, correction unit 214 and storage unit 215. Red, blue and green laser lights are emitted from the laser light sources 201R, 202B and 203G respectively. The laser light source 201R and laser light source 202B are semiconductor lasers. The laser light source 203G is a second harmonic generation (SHG) green laser light source in which a solid state laser that emits infrared laser light with semiconductor laser excitation and a second harmonic generation element are combined. The laser light sources 201R, 202B and 203G for each color are driven by the drive circuit 204. The green laser light that is emitted from the laser light source 203G is modulated by the spatial modulation element 206 that is disposed on the optical path.

For the spatial modulation element 206, an acousto-optical element or electro-optical element can be used.

The dichroic mirrors 207 to 209 have a function to reflect a light having a predetermined wavelength, and a function to transmit light other than the light having a predetermined wavelength, so as to match the optical axis of R, G and B laser lights having different wavelengths. The scanning unit 210 scans the projection target surface 212 with the laser light 211. For the scanning unit 210, a piezoelectric drive or electrostatic micro-mirrors can be used. The laser light reflected and scattered by the projection target surface 212 is received by the photodetector 213. The control unit 205 controls the drive circuit 204, scanning unit 210 and modulator 206 based on the image signals. The output of the photodetector 213 is input to the control unit 205, and is stored in the storage unit 215, along with the value for specifying the scanning angle of the scanning unit 210. The correction unit 214 corrects images based on the output of the photodetector 213 or a value stored in the storage unit 215 and the spectral reflectance at each scanning angle of the scanning unit 210, and inputs the corrected image signals to the control unit 205.

Figure 24:
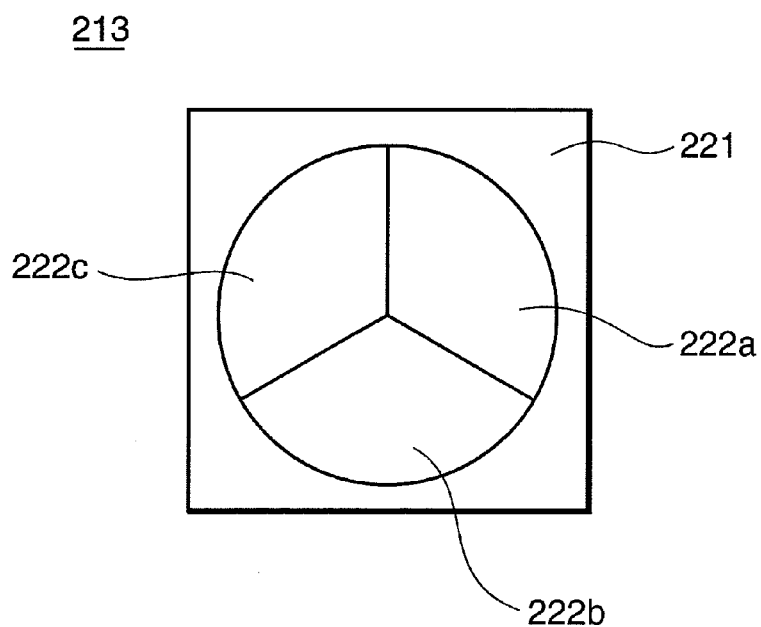
FIG. 24 is a diagram depicting a general configuration of a photodetector of the scanning type image display device in FIG. 23.

FIG. 24 shows a general configuration of the photodetector 213. As FIG. 24 shows, the photodetector 213 has a circuit substrate 221, and detection units 222a, 222b and 222c which are formed on the circuit substrate 221. The detection units 222a, 222b and 222c have color filters that transmit red light, green light and blue light respectively. The laser light that is reflected and scattered from the projection target surface 212 enters the photodetectors 222a, 222b and 222c, and transmits through the color filter according to the wavelength of the laser light, so that the received light quantity for each laser wavelength is detected.

The circuit substrate 221 sends the received light quantity of each laser wavelength to the control unit 205 as electric signals. The circuit substrate 221 has been adjusted in advance such that light quantity signals of red, green and blue become the same when white light enters the photodetector 213. Three individual photodetectors may be disposed for the photodetectors 222a, 222b and 222c, or one photodetector may be used for all by area division.

Figure 25A:
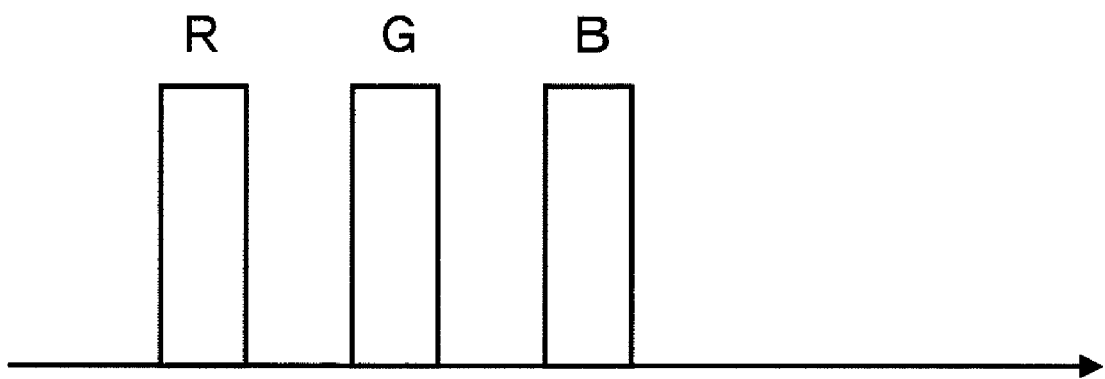
FIG. 25A is a diagram depicting an example of a detection signal of the photodetector in FIG. 24.
Figure 25B:
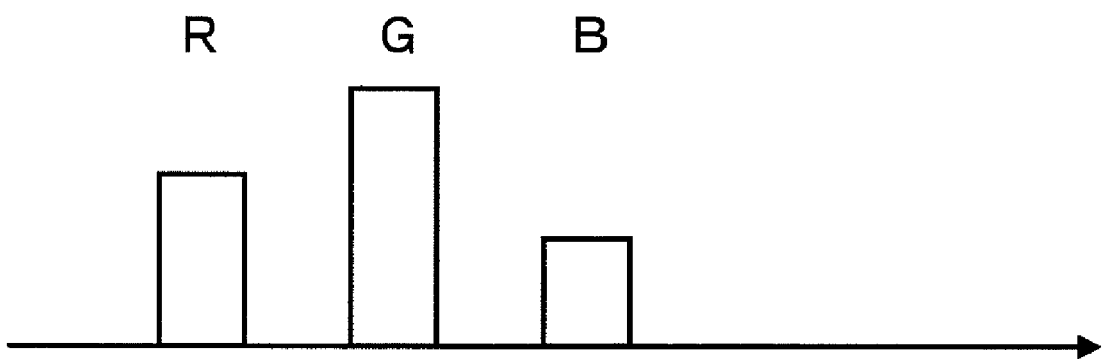
FIG. 25B is a diagram depicting another example of a detection signal of the photodetector in FIG. 24.

FIG. 25A and FIG. 25B show an example of detection signals of the photodetector 213 when a color filter is not used. It is assumed that the laser light source 201R, laser light source 202B and laser light source 203G for each color, operate in color sequential mode where each light source emits for a short time independently. FIG. 25A shows the emission intensity of the lasers along the time axis. If the output of the photodetector is acquired for a short time, synchronizing with the emission timing of the laser, then intensity of reflected and scattered light of each laser light source is as shown in FIG. 25B. In this case, a color filter is not required, and only one circuit channel is sufficient, so the configuration of the photodetector 213 can be simplified.

The operation of the scanning type image display device of the present embodiment will be described with reference to FIG. 23. First the control unit 205 receives the image signal from the image input unit (not illustrated), and controls the drive circuit 204, modulator 206 and scanning unit 210. The drive circuit 204 drives the laser light source 201R, laser light source 202B and laser light source 203G for each color, and directly modulates the laser light source 201R and laser light source 202B, which are semiconductor lasers. The laser light source 203G, which is an SHG green laser light and cannot be directly modulated at high-speed, is modulated by the modulator 206. The R, G and B laser lights of which intensity is appropriately modulated by the image signals are combined into one beam by the dichroic mirrors 207 to 209. This beam, as laser light 211, is used to scan by the scanning unit 210, which is driven by the control unit 205 according to the imaging signal, and forms the image on the projection target surface 212. The laser light that is reflected and scattered on the projection surface 212 is detected for each wavelength of the laser light 211 by the photodetector 213. The function of separating the laser light 211 for each wavelength here may be implemented by the photodetector 213 with a color filter shown in FIG. 24. The emission system that provides a time difference to each wavelength shown in FIG. 25A and FIG. 25B may be used. The intensity of the laser light for each wavelength, that is detected by the photodetector 213, is sent to the control unit 205. The control unit 205 forms a value to indicate the scanning angle of the scanning unit 210, that is a pair of signals of a drive amount of a biaxial mirror or scanning angle detection unit (not illustrated) and a signal of the photodetector 213, and records this in the storage unit 215. Since the spectral reflectance for each scanning angle is recorded in the storage unit 215, the spectral reflectance distribution on the projection target surface 212 can be acquired, and based on this information, the correction unit 214 corrects the image signal that is input from the image input unit (not illustrated) to the control unit 205.

The steps of correcting the image according to the present embodiment will now be described with reference to FIG. 26A, FIG. 26B, FIG. 27A and FIG. 27B.

Figure 26A:
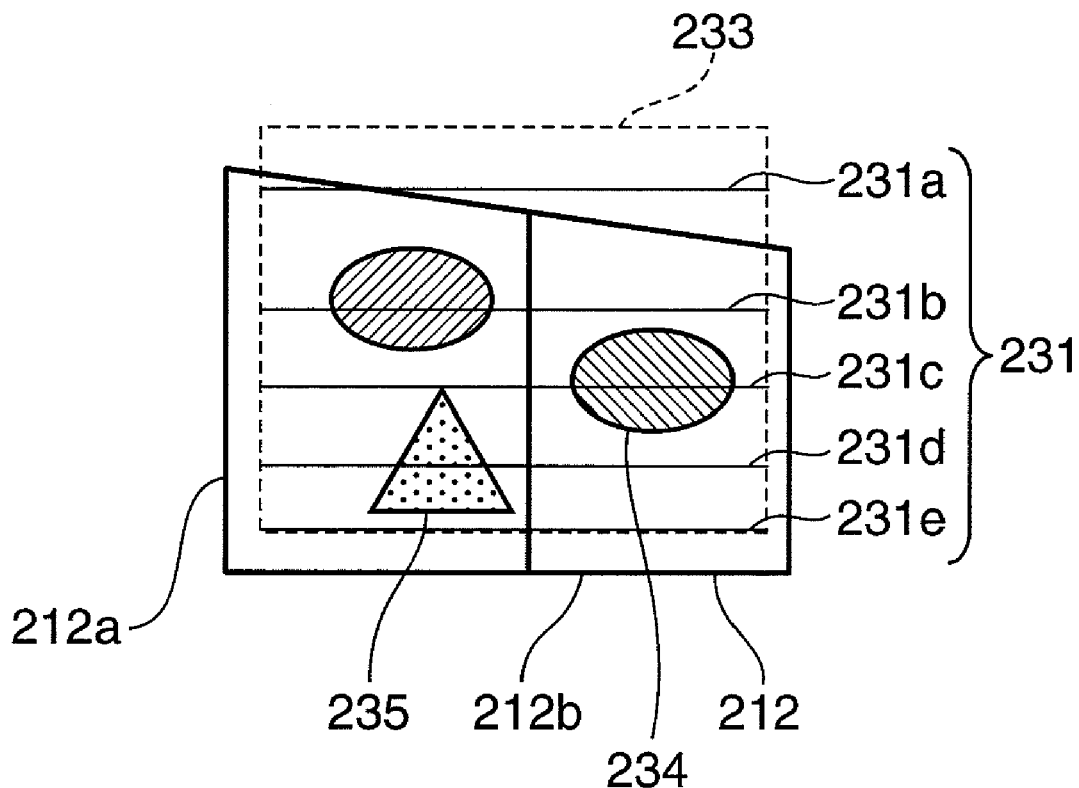
FIG. 26A is a diagram depicting a scanning line on the projection target surface and the reflected light quantity for each wavelength on the scanning line.
Figure 26B:
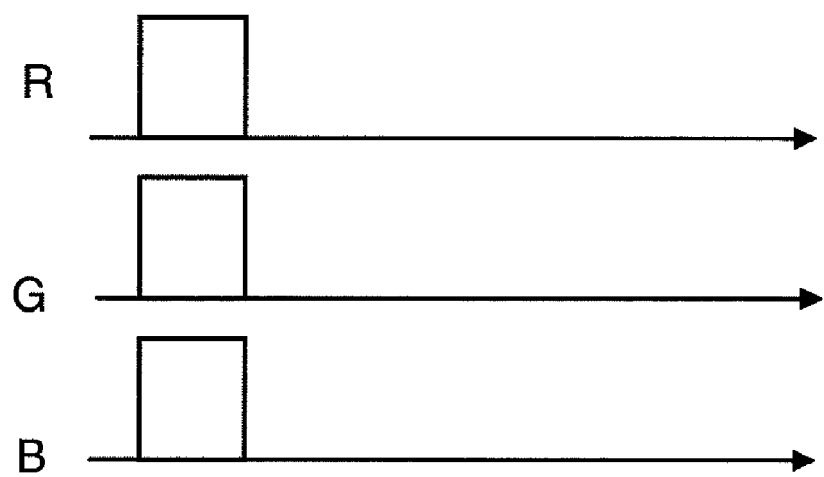
FIG. 26B is a diagram depicting a scanning line on the projection target surface and the reflected light quantity for each wavelength on the scanning line.

FIG. 26A and FIG. 26B are diagrams depicting the scanning lines on the projection target surface 212 and the reflected light quantity for each wavelength on the scanning lines. The projection target surface 212 shown in FIG. 26A and FIG. 26B is constituted by two projection target surfaces, 212a and 212b, having different reflectances. The numeral 231 indicates scanning lines which are the scanning locus of the laser light 211, and constitute a scanning area 232. The areas 233, 234 and 235 are areas where the spectral characteristics of the reflectance are different from the ambient area on the projection target surface 212, such as a color irregularity or a colored pattern. The upper right portion of the projection target surface 212 is missing with respect to the scanning area 232. To simplify the description, it is assumed that an image of which entire surface is white is displayed on the scanning area 232. At this time, if the spectral reflectance of the projection target surface 212 does not depend on the wavelength, the white light enters the photodetector 213, so the red, green and blue light quantity signals are the same.

FIG. 26B shows the signals of the photodetector 213 with respect to the scan line 231a in FIG. 26A. The red, green and blue light quantity signals are detected with a same intensity in an area where the projection target surface 212 exists, and the red, green and blue signals are not detected at all after the scanning line 231a comes to the missing portion of the projection target surface 212. Therefore a predetermined threshold is set in advance, and when three color light quantity signals becomes a predetermined threshold or less, it can be judged that the projection target surface 212 is missing. The threshold is set because ambient background light may enter the photodetector, and the light quantity signal does not become "0" in this case. If the missing portion of the projection target surface 212 is detected like this, power can be decreased by not irradiating the laser light onto the missing portion, which can contribute to saving power of portable equipment.

Figure 27A:
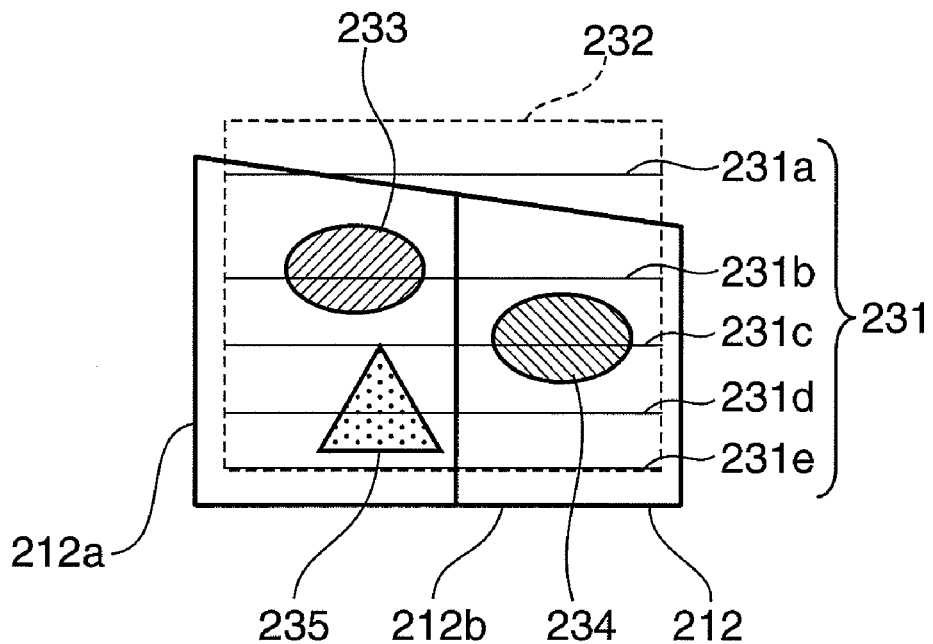
FIG. 27A is a diagram depicting a scanning line of the projection target surface and the reflected light quantity for each wavelength on the scanning line.
Figure 27B:
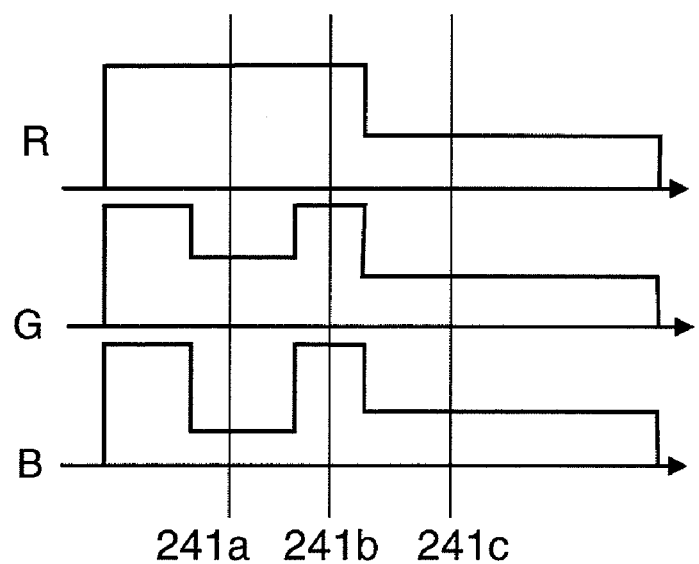
FIG. 27B is a diagram depicting a scanning line on the projection target surface and the reflected light quantity for each wavelength on the scanning line.

FIG. 27A is also a diagram depicting scanning lines on the projection target surface 212 and the reflected light quantity for each wavelength on the scanning lines. FIG. 27B shows the signals of the photodetector 213 with respect to the scanning line 231b in FIG. 27A. The red, green and blue light signals are detected with a same intensity in an area where the projection target surface 212 exists, and red, green and blue light quantity signals become different after the scanning line 231b comes to the area 233 on the projection target surface 212. The ratio of the reflected light quantity in the area 233 is high for the red light quantity signal, so it can be judged that the area 233 has a high color irregularity in the red component. Therefore when the area 233 is scanned with the laser light, the light quantities of green and blue are increased, whereby color irregularity can be corrected. The color irregularity may also be corrected by decreasing the light quantity of red. In the case of decreasing the light quantity of red, a brightness difference is generated compared with the ambient area, but the power consumption can be decreased, which is effective to save power of portable equipment. Comparing the signal of photodetector 213 with respect to the scanning line 231b between the detection position 241b on the projection target surface 212a and the detection position 241c on the projection target surface 212b, the light quantity ratio of red, green and blue in the detection position 241b and the light quantity ratio of red, green and blue in the detection position 241c are the same, so it is judged that a color difference does not exist between the detection position 241b and the detection position 241c, but a brightness difference does exist. In this way, the color irregularity and brightness difference can be detected by comparing the light quantity ratio of red, green and blue in the scanning area 232, so as mentioned above, an image with high image quality, that is not influenced by color irregularity and brightness difference on the projection target surface, can be displayed by correcting the light quantity of the laser light source 201R, laser light source 202b and laser light source 203G for each color. In the present embodiment, white light is irradiated onto the projection target surface to simplify description, but this is not limited to white light, but the spectral reflectance distribution could be acquired from the normal display image. In this case, the output ratio of the three primary color laser lights is known in advance based on the image information to be displayed, so the spectral reflectance distribution can be known by comparing this output ratio with the light quantity ratio of the three primary color laser lights measured by the photodetector. The reflectance distribution can also be known by comparing the total light quantities of the three primary color laser lights measured by the photodetector.

In the present embodiment, the configuration of equipping a plurality of laser light sources was described, but a single laser light source may be used, and needless to say, a color filter is unnecessary in this case.

Embodiment 10

Figure 28:
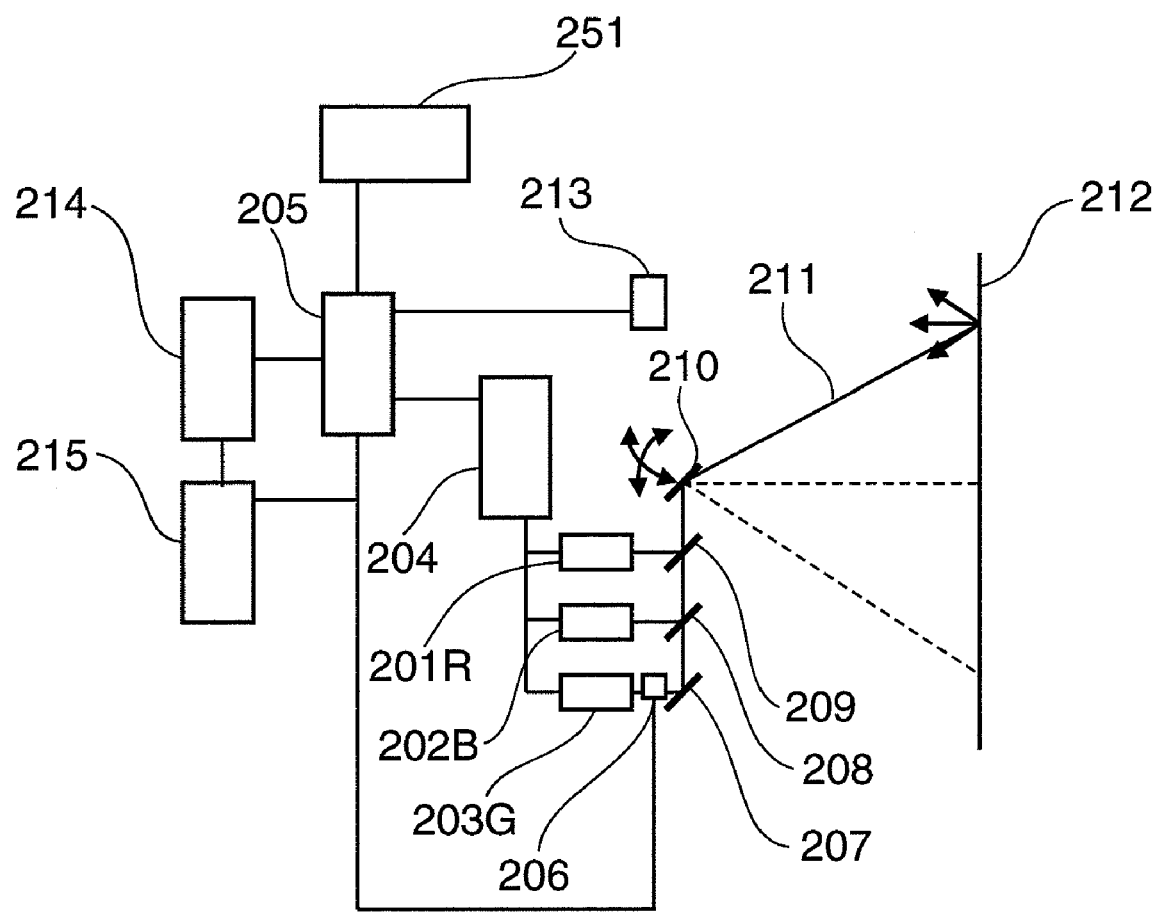
FIG. 28 is a diagram depicting a general configuration of a scanning type image display device according to an embodiment of the present invention.

FIG. 28 shows a general configuration of the scanning type image display device according to Embodiment 10. As FIG. 28 shows, the difference of the present scanning type image display device from the scanning type image display device shown in FIG. 23 is that a positional stability detection unit 251 is equipped. The positional stability detection unit 251 detects the change of attitude and the change of position of the scanning type image display device, and sends the detection signals to the control unit. The positional stability detection unit 251 can be any unit that can detect acceleration, angular acceleration, inclination or the like, such as an acceleration sensor, geo-magnetic sensor and gyro.

The scanning type image display device of the present embodiment can detect an attitude change and position change by the positional stability detection unit 251. If the amounts of the attitude change and position change are great, this means that the position of the displayed image is moving greatly, and the image correction may be stopped because the viewer did not notice image quality very much, even if the image is not corrected. If the attitude change and position change are stopped, the position of the display image is also fixed, so a display image with high image quality can be acquired when image correction is performed. In this case, when the control unit 205 judges that an attitude change and position change stopped based on the detection signals of the position stability detection unit 251, a white light can be irradiated for a time short enough not to be recognized by a viewer in order to acquire data for image correction. If the amounts of attitude change and position change are small, it is unnecessary to perform image correction. The frequency of measuring the spectral reflectance distribution for image correction may be changed according to the frequency of the attitude change and position change, in order to balance the decrease of power to be spent for the spectral reflectance distribution measurement and the increase of image quality of the display image. In other words, if there is no attitude and position changes, then the spectral reflectance distribution can be measured only once at the beginning, and if there is attitude and position frequency changes, the spectral reflectance distribution is also measured more frequently. Since the position change of the display image can be detected by the positional stability detection unit 251, whether an image is corrected or not can be switched depending on whether a position changed or not, and image correction can be stopped when image correction is unnecessary, such as the case of the display image moving greatly, and therefore power consumption can be decreased.

Embodiment 11

Figure 29:
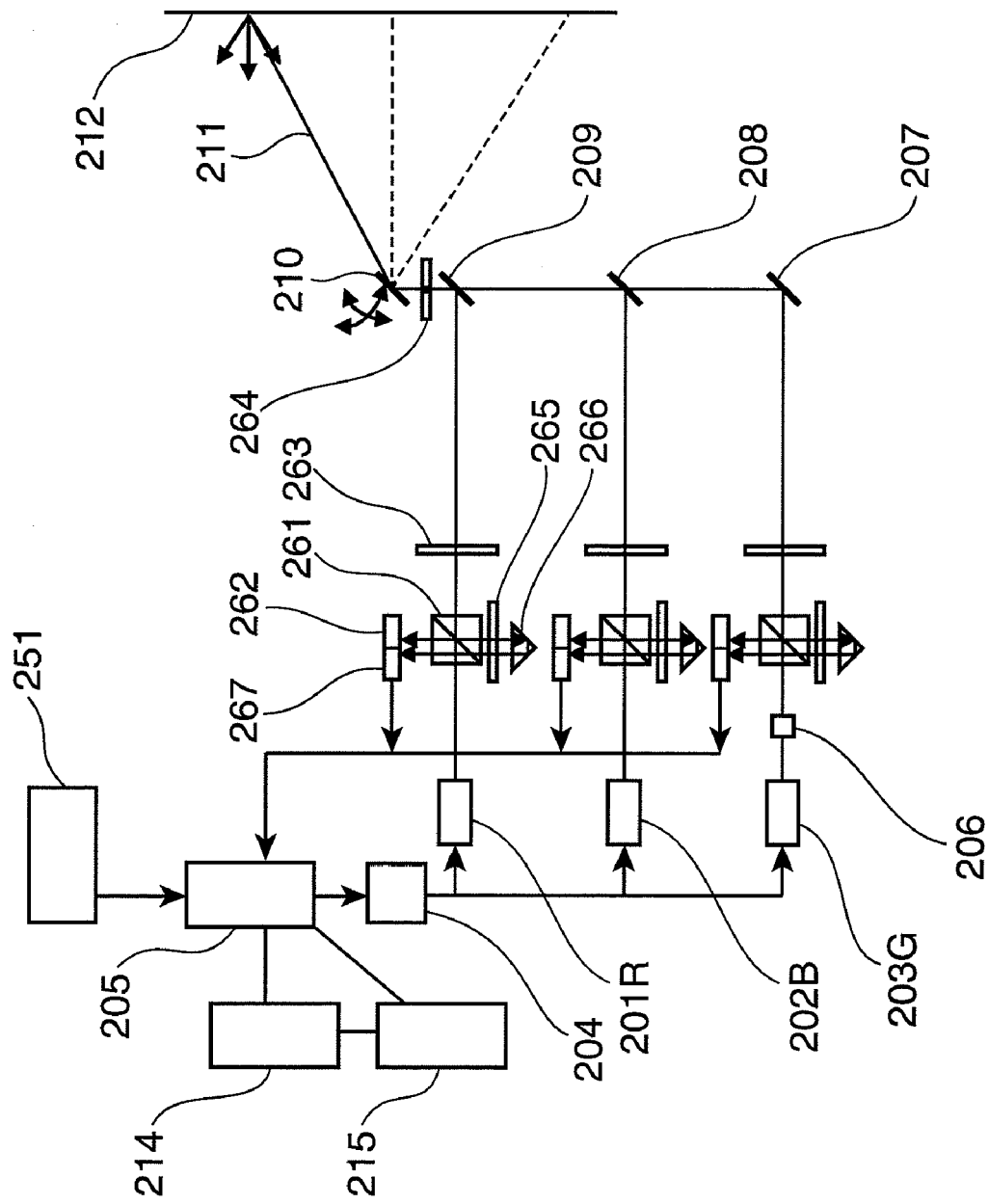
FIG. 29 is a diagram depicting a general configuration of a scanning type image display device according to another embodiment of the present invention.

FIG. 29 shows a general configuration of the scanning type image display device according to Embodiment 11 of the present invention. In FIG. 29, composing elements the same as the scanning type image display device according to Embodiment 10 shown in FIG. 28 are denoted with the same reference symbols, for which detailed description is omitted.

As FIG. 29 shows, this scanning type image display device has a polarized beam splitter 261 corresponding to the laser light for each color, R, G and B, a light source output detector 262 for detecting the optical output of the laser light source for each color, a pin hole 264, rectangular prism 266, and a photodetector 267. The light source output detector 262 is constituted by a photodiode or the like, just like the photodetector 267. The pair of light source output detector 262 and photodetector 267 may be disposed on a same substrate. A same photodiode may be area-divided so that one area is used for the light source output detector 262, and the other for photodetector 267. In the case of area division, cost can be reduced. This scanning type image display device also has ¼ wavelength plates 263 and 265. The ¼ wavelength plates 263 and 265 transform the polarization state of laser light to transmit, from linearly polarized light into circularly polarized light. In FIG. 29, 264 indicates a pin hole, and 266 indicates a rectangular prism.

FIG. 28 shows a general configuration of the scanning type image display device according to Embodiment 11 of the present invention. In FIG. 28, composing elements the same as the scanning type image display device according to Embodiment 10 shown in FIG. 27 are denoted with the same reference symbols, for which detailed description is omitted.

The operation of the scanning type image display device will now be described with reference to FIG. 29.

The laser light that is emitted from the laser light source 201 is a linearly polarized light, and the polarization plane is slightly rotated from the polarization plane that transmits to the polarized beam splitter 261. Therefore most of the laser light that entered the polarized beam splitter 261 is transmitted, but a part of it is reflected and enters the light source output detector 262, and the light quantity thereof is detected.

The laser light that transmitted through the polarized beam splitter 261 is transformed into circularly polarized light after transmitting through the ¼ wavelength plate 263, and then is reflected by the dichroic mirror 209, passes through the pin hole 264, and is used for scanning onto the projection target surface 212 by the scanning unit 210.

A part of the laser light that was reflected and scattered on the projection target surface 212 is reflected by the scanning unit 210, returns through the pin hole 264 and dichroic mirror 209 in reverse order, and transmits through the ¼ wavelength plate 263. At this time, the polarized state of the laser light returns from circular polarization to linear polarization, but the polarization plane of the linearly polarized light becomes perpendicular to the polarization plane of the original linearly polarized light.

Therefore the returned laser light is reflected by the polarized beam splitter 261, transmits through the ¼ wavelength plate 265, is reflected twice by the rectangular prism 266, and transmits through the ¼ wavelength plate 265 again. The laser light that transmits through the ¼ wavelength plate 265 and enters the polarized beam splitter 261, of which polarization plane has been rotated 90°, transmits through the polarized beam splitter 261 and enters the photodetector 267.

The light quantity of laser light for each color detected by the light source output detector 262 and the light quantity of the laser light returned from the projection target surface 212 detected by the photodetector 267 are compared for the laser light source 201R, laser light source 202B and laser light source 203G for each color, then the spectral data on reflection and scattering of the projection target surface 212 is acquired, so this data is compared with the original image signal and correction is performed, whereby an image with high image quality, that is not affected by the color irregularity of the projection target surface 212 and the difference of reflectance/scattering rate, can be displayed.

According to the present embodiment, the light source output detector 262 is disposed, therefore output from the laser light source 201R, laser light source 202B and laser light source 203G for each color can be detected. As a result, even if output of the laser light source 201R, laser light source 202B and laser light source 203G for each color changes, the color irregularity and reflectance/scattering rate of the projection target surface 212 can be detected at high precision. Also by detecting the light quantity of the laser light that returns via the scanning unit 210 using the photodetector 267, the color irregularity and reflectance/scattering rate of the portion of the projection target surface 212, where the laser light is being irradiated, can be accurately detected.

By disposing the pin hole 264, the light coming from portions other than the portion being irradiated by the laser light of the projection unit 212 can be blocked, therefore the color irregularity and reflectance/scattering rate of the portion which is being irradiated by the laser light can be detected at high precision.

The lower limit of the spread angle of the laser light is determined by the beam diameter and wavelength, but in the case of a red laser light having a 630 nm wavelength with a 1 mm beam diameter, for example, the lower limit of the spread angle is 0.8 mrad. In reality, the spread angle could be 2 to 3 times the spread angle of the lower limit value, so the spread angle may spread up to 2.4 mrad or so.

Hence for all of the laser light coming back from the scanning unit to transmit through the pin hole 264, so that a part of it is not blocked to transmit through the pin hole 264, the diameter (m) of the pin hole 264 can be D+L×0.0024 or more, where D (m) denotes the diameter of the laser light in the scanning unit 210, and L (m) denotes the distance between the scanning unit 210 and the pin hole 264. It is difficult to judge the deterioration of the image quality including the return light from the adjacent scanning areas, so the diameter (m) of the pin hole 264 can be D+L×0.0072 or less.

Embodiment 12

Figure 30:
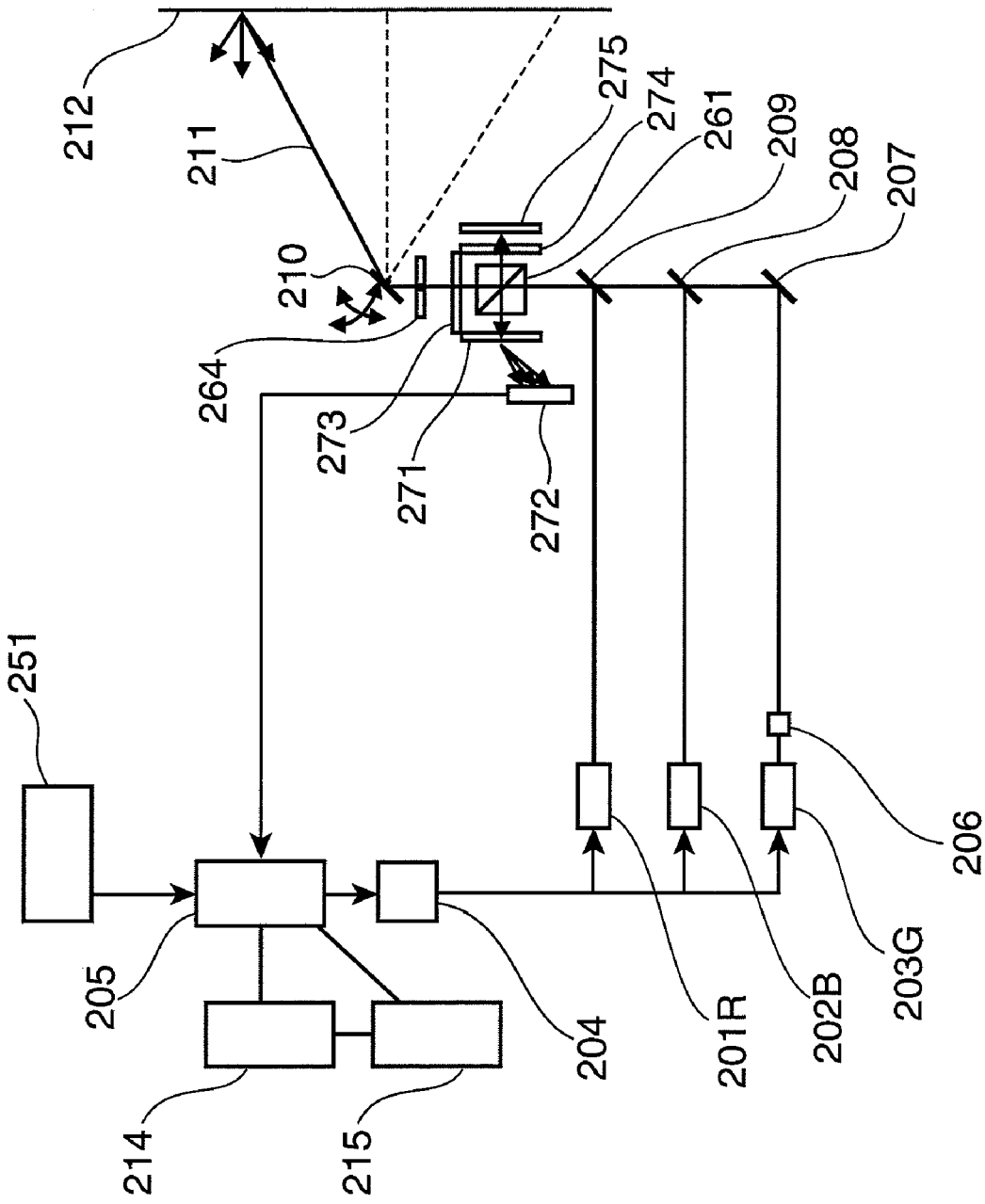
FIG. 30 is a diagram depicting a general configuration of a scanning type image display device according to another embodiment of the present invention.

FIG. 30 shows a general configuration of the scanning type image display device according to Embodiment 12 of the present invention. In FIG. 30, composing elements the same as Embodiment 11 shown in FIG. 29 are denoted with the same symbols, for which detailed description is omitted.

As FIG. 30 shows, the scanning type image display device has a laser light source 201R, laser light source 202B and laser light source 203G for each color, a drive circuit 204, control unit 205, spatial modulation element 206, dichroic mirrors 207 to 209, scanning unit 210, correction unit 214, storage unit 215, positional stability detection unit 251 and pin hole 264.

Just like Embodiment 9, the output laser intensity is directly modulated by the drive circuit 204 for the laser light source 201R and laser light source 202B. The intensity of the green laser light that is emitted from the laser light source 203G is modulated by the spatial modulation element 206, that is disposed on the optical path thereof, using the drive circuit 204.

The scanning type image display device 200 also has an optical branching element 271 that includes a polarization hologram and diffraction grating, a photodetector/light source output detector 272, ¼ wavelength plates 273 and 274 and a mirror 275.

The optical branching element 271 is an optical element that switches diffraction and transmission depending on the polarization direction of the entering laser light, and diffracts the laser light depending on the wavelength. The optical branching element 271, according to the present embodiment, is disposed so that the laser light diffracts in a direction vertical to the page face in FIG. 30 when the polarization plane is parallel with the page face.

Figure 31:
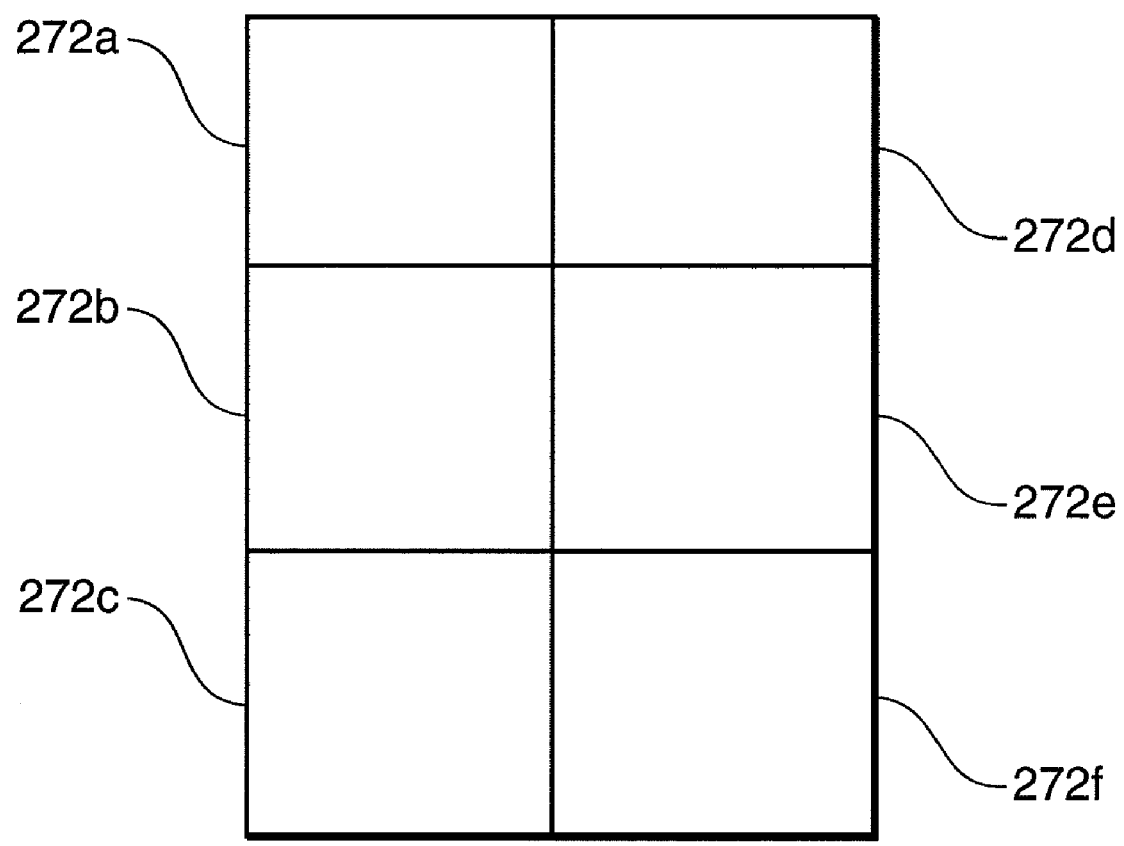
FIG. 31 is a top view depicting a photodetector/light source output detector of the scanning type image display device in FIG. 30.

FIG. 31 is a top view depicting the photodetector/light source output detector 272. The photodetector/light source output detector 272 has light source output detection portions 272a, 272b and 272c, and photodetection portions 272d, 272e and 272f. The photodetector/light source output detector 272 is formed by dividing the area of a photodiode. In FIG. 30, the laser light that is output from the laser light source 201R, laser light source 202B and laser light source 203G for each color, is partially reflected by the polarized beam splitter 261, just like Embodiment 11, and is diffracted in the optical branching element 271 due to the difference of wavelengths, and enters the light source output detection portions 272a, 272b and 272c shown in FIG. 31.

In the present embodiment, the laser light having the longest wavelength enters 272c, and the laser light having the shortest enters 272a. In other words, the blue laser light, green laser light and red laser light enter the light source output detection units 272a, 272b and 272c, respectively in this sequence.

Then the laser light that returned from the projection target surface 212 transmits through the ¼ wavelength plate 273, polarized beam splitter 261, ¼ wavelength plate 274, mirror 275 and polarized beam splitter 261 in this sequence, and enters the optical branching element 271. The polarization plane of the laser light which entered the optical branching element 271, which is parallel with the page face in FIG. 30, is diffracted in a direction vertical to this page face by a polarization hologram, and then is diffracted again due to the difference of wavelengths, and enters the photodetection portions 272d, 272e and 272f of the light source output detector/photodetector 272 shown in FIG. 31. By comparison of the light quantity detected by the light source output detection portions and the light quantity detected by the photodetection portions, spectral data on reflection and scattering of the projection target surface 212 is acquired, so a high quality image, which is not affected by color irregularity and difference of reflectance/scattering rate of the projection target surface 212, can be displayed by comparing with the original signal, and performing correction.

According to the present embodiment, the light source output detector and photodetector of the laser light source 201R, laser light source 202B and laser light source 203G for each color, are integrated, therefore compactness and low cost can be implemented.

Embodiment 13

Figure 32:
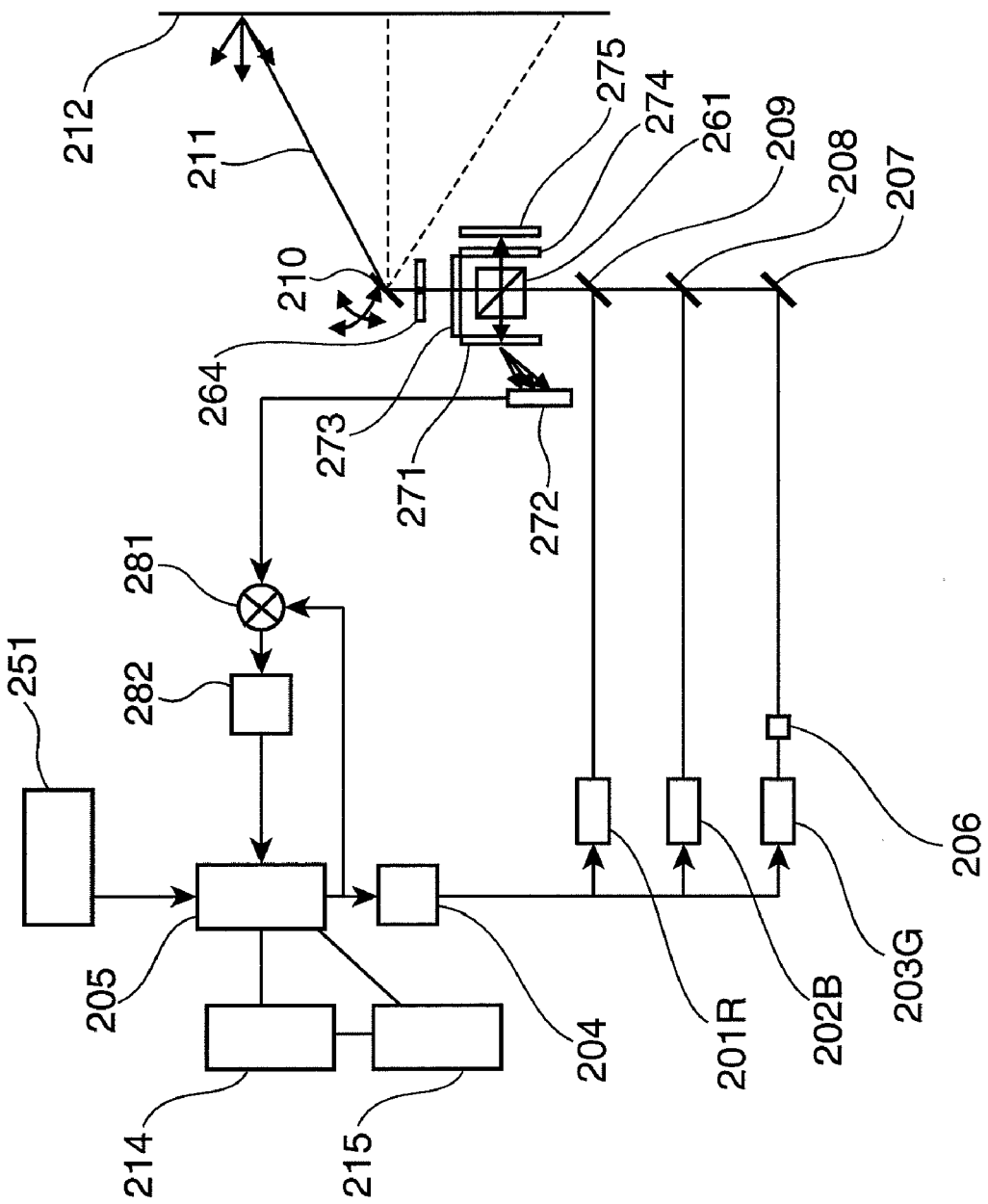
FIG. 32 is a diagram depicting a general configuration of the scanning type image display device according to another embodiment of the present invention.

FIG. 32 shows a configuration of a scanning type image display device according to Embodiment 13 of the present invention. In FIG. 32, composing elements the same as the scanning type image display device according to Embodiment 12 shown in FIG. 30 are denoted with the same reference symbols, for which detailed description is omitted.

In FIG. 31, 281 is a multiplier, and the input signal is multiplied and output. 282 is a low pass filter, that removes the AC components of the input signal so as to output the DC components. In Embodiment 13, the control unit 205 controls the drive circuit 4 with image signals, as well as with 100 MHz modulation signals, for example. The laser light source 201R, laser light source 202B and laser light source 203G for each color, are modulated not only with image signals but also with 100 MHz modulation signals. The signals detected by the photodetection portions 272d, 272e and 272f of the photodetector/light source output detector 272 are input to the multiplier 281. 100 MHz modulation signals from the control unit 205 are also input to the multiplier 281.

In FIG. 32, 281 is a multiplier, and an input signal is multiplied and output. 282 is a low pass filter that removes the AC components of the input signal so as to output DC components. In Embodiment 13, the control unit 205 controls the drive circuit 4 with image signals, as well as with 100 MHz modulation signals, for example. The laser light source 201R, laser light source 202B and laser light source 203G for each color, are modulated not only with image signals, but also with 100 MHz modulation signals. The signals detected by the photodetection portions 272d, 272e and 272f of the photodetector/light source output detector 272 are input to the multiplier 281. 100 MHz modulation signals from the control unit 205 are also input to the multiplier 281, so the multiplier 281 outputs only the components modulated at 100 MHz, out of the signals detected by the photodetection portions 272d, 272e and 272f, as DC components, and outputs the noise component as an AC component. The low pass filter 282 in the subsequent stages of the multiplier 281 filters only DC components and outputs them, so detection signals after the noise components are removed are input to the control unit 205. In the present embodiment, output of the laser light source 201R, laser light source 202B and laser light source 203G for each color, are modulated, and detection signals detected by the photodetection portions are synchronously detected with the modulation signals, so detection signals with minimal noise can be obtained, which makes correction at high precision possible.

As described above, a projector according to one aspect of the present invention has: a light source; a light modulation unit that modulates a light emitted from the light source based on an image signal; a display control unit that outputs the image signals including cyclic main image signals to the light modulation unit and controls the display thereof; a projection unit that projects the light modulated by the light modulation unit; and an imaging unit that captures an image based on the light projected from the projection unit, characterized in that the display control unit inserts correction image signals for projecting a correction image, that is visually recognized as a uniform white or gray screen when time integration is performed, between the cyclic main image signals.

According to the above configuration, the correction image, that is visually recognized as a uniform white or gray screen when the images other than the main image are time-integrated, is inserted between cyclic main image signals, so the user who observes the main image cannot recognize the correction image. Therefore the correction image can be inserted with suppressing deterioration of the image quality of the main image. If this correction image is captured by the imaging portion and used for image correction, a projector, that can correct the image according to a constantly changing projection target can be implemented with a simple configuration while suppressing deterioration of image quality of the main image.

It is preferable that the imaging unit captures only the correction image synchronizing with the projection timing of the correction image.

According to the above configuration, the main image that is periodically projected with a predetermined drive frequency is not captured, and only a correction image that is inserted between cyclic main images independently from the main image is captured at the correct timing. Because of this, processing to separate the main image and the correction image, and image processing that requires a strict real-time procedure, such as extraction processing of a correction image from the main image, are all unnecessary.

It is preferable that the correction image is at least two images that cancel the difference of color or brightness in the image plane when time integration is performed.

In this way, the correction image can be a combination of two or more images that cancel the difference of color or brightness in the image plane when time-integration is performed. Therefore each correction image can be created with high flexibility as a combination of various colors, brightnesses and image patterns.

It is preferable that the projection unit projects the correction image with white light.

According to the above configuration, the modulation frequency of the correction image can be decreased, and a projector with low cost and low power consumption can be implemented.

It is preferable that the projection unit projects the correction image that includes at least a red image, green image and blue image.

According to the above configuration, influence of reflectance on the surface of the projection target to be a screen can be decreased when the correction image is captured, so the correction image can be captured accurately.

It is preferable that the projection unit projects a correction image that includes at least two images having complementary colors.

According to the above configuration, the modulation frequency of the correction image can be decreased, and a projector with low cost and low power consumption can be implemented.

It is preferable that the projection unit projects a correction image which cancels the color or brightness of the projection target captured by the imaging unit during a non-projection period of a main image which is projected at a predetermined frequency, and which is visually recognized as uniform white or gray on the plane of the projection target when time integration is performed.

According to the above configuration, the correction image can be substantially used for color correction or brightness correction of the main image, so a projector that projects a main image with higher image quality can be implemented.

It is preferable that the correction image is at least two pattern images of which brightnesses are inverted from each other.

According to the above configuration, the pattern image can be inserted into the main image without letting the user recognize it.

It is preferable that at least one of the pattern images has a lattice pattern.

According to the above configuration, bumps on the surface of the projection target to be a screen can be easily known.

It is preferable that the above configuration further has a correction unit that corrects the main image signals based on the correction image captured by the imaging unit, and the correction unit corrects distortion of the main image.

In this case, the distorted image correction, according to the captured pattern image and the projection of the main image in a state where the pattern image is not recognized by the user, can be simultaneously performed, so a projector with high image quality can be implemented.

It is preferable that at least one of the pattern images is a two-dimensional code.

According to the above configuration, the two-dimensional code can be inserted into the main image without deteriorating the image quality of the main image, and without letting the user recognize it.

It is preferable that the above configuration further has an analysis unit that extracts information from the two-dimensional code captured by the imaging portion.

According to the above configuration, information can be acquired from the two-dimensional code inserted into the main image.

It is preferable that the correction image is one or a plurality of uniform image(es).

According to the above configuration, the reflectance of the projection target to be a screen can be easily known.

It is preferable that the above configuration further has a correction unit that corrects the main image signals based on the correction image captured by the imaging unit, and the correction unit corrects a color of the main image.

According to the above configuration, color correction according to the captured uniform image and projection of the main image in a state where the pattern image is not visually recognized by the user can be performed simultaneously, so a projector with high image quality can be implemented.

It is preferable that an LED is used as the light source.

In this case, the time division image display system can be implemented by turning the light source ON/OFF, so the color wheel which is required for the lamp light source can be omitted, and a low cost projector can be implemented. Since the light source itself is small, a compact projector can be implemented.

It is preferable that a laser light source is used for the light source.

In this case, the time division image display system can be implemented by turning the light source ON/OFF, so a low cost projector can be implemented. Since the light source itself is small, a compact projector can be implemented. Furthermore the laser light source, which has a narrow spectrum width, excels in color reproducibility, so color correction of the main image can be easily performed for the projection target.

In the above configuration, it is preferable that the projection unit includes a projection lens that projects light modulated by the light modulation unit, and the imaging unit also uses the projection lens as an imaging lens.

In this case, one lens can be shared for the projection lens and imaging lens, so a compact projector can be implemented at low cost.

It is preferable that the projection unit further has a polarized beam splitter that separates light according to the polarization, and a ¼ wavelength plate that is disposed between the polarized beam splitter and the projection lens and sets the phase difference between a going path and returning path of the light that reciprocatingly transmits through the projection lens to $\pi/2$.

According to the above configuration, the optical system can be downsized, so a compact projector can be implemented. Since polarized light can be used efficiency, the light utilization efficiency can be increased, and a projector with low power consumption can be implemented.

It is preferable that the light modulation unit is a spatial modulation element that spatially modulates light.

According to the above configuration, the power of the light source can be increased, so a projector with high brightness can be implemented.

It is preferable that a reflection type single plate liquid crystal display element is used for the spatial modulation element.

In this case, the light utilization efficiency can be improved, and a projector with low power consumption can be implemented.

It is preferable that a multiple of micro-mirrors that can change the angle is used for the spatial modulation element.

In this case, the drive frequency of the time division system can be increased, so an image of which color breaking is further decreased can be acquired. It can be further suppressed that the user will recognize the correction image inserted in the main images, therefore the main image with high image quality can be observed.

It is preferable that the light modulation unit further has a scanning unit that scans light two-dimensionally, and an intensity modulation unit that can modulate the intensity of light that enters from the light source to the scanning unit.

According to the above configuration, an image with minimal blur can be projected even if the surface of the projection target has bumps.

It is preferable that the drive frequency of the main image is 180 HZ or more.

If the drive frequency is 180 Hz or more, the correction image inserted by time division can be recognized less, so a main image having high image quality can be observed.

It is preferable that the above configuration further has a processing unit that computes the prediction of the change of the projection target based on a plurality of the correction images captured in different frames by the imaging unit.

According to the above configuration, the main image can be corrected by predicting the change of the relative angle between the projector and projection target, or the change of the form of the projection target, so a main image having high image quality can be observed.

It is preferable that the above configuration further has a signal transmission/reception unit that transmits/receives a synchronization signal that indicates a timing to project the correction image.

According to the above configuration, when a plurality of projectors are used, a timing to project the correction image of each projector can be synchronized, so only the correction image of another projector that is projecting the image can be captured and acquired.

It is preferable that the above configuration further has a switching unit that switches the setting whether the correction image signal is inserted between the cyclic main image signals or not.

According to the above configuration, whether the correction image signal is inserted or not can be switched. Therefore when the relative positional relationship of the screen and projector is fixed and it is unnecessary to correct the main image constantly, for example, insertion of the correction image can be stopped. Thereby the correction image can be inserted only when necessary, and a projector with low power consumption that can improve image quality can be implemented.

It is preferable that the above configuration further has a motion sensor that detects motion of the projector, and the switching unit inserts the correction image signal when the motion sensor detects motion, and does not insert the correction image signal when the motion sensor does not detect motion.

According to the above configuration, insertion of the correction image can be automated depending on the detection result of the motion by the motion sensor, so whether image correction is necessary or not can be decided accurately, and the correction image can be inserted efficiently.

A projector according to another aspect of the present invention has: a light source, a light modulation unit that modulates a light emitted from the light source based on an image signal; a display control unit that outputs the image signals including cyclic main image signals to the light modulation unit, and controls the display thereof; a projection unit that projects the light modulated by the light modulation unit to a projection target; an imaging unit that captures the projection target; and an image generation unit that cancels the color or brightness of the projection target captured by the imaging unit during a non-projection period of a main image which is projected at a predetermined frequency, and generates a correction image signal for projecting the correction image that is visually recognized as uniform white or gray in the plane of the project target when time integration is performed, and the display control unit inserts the correction image signal between cyclic main image signals.

According to the above configuration, even if the relative positions of the projector and the projection target constantly change, the projection target itself is constantly captured by the imaging unit at a timing in a non-projecting period for the main image that is projected at a predetermined frequency. And color or brightness of the projection target itself is cancelled, and a correction image that is visually recognized as uniform white or gray in the plane of the projection object when time integration is performed is constantly generated, and this correction image is inserted between cyclic main image signals. Thereby the correction image can also be substantially used for color correction or brightness correction of the main image, so a projector that projects a main image having higher image quality can be implemented.

A scanning type image display device according to another aspect of the present invention has: a laser light source; a drive circuit for driving the laser light source according to the image signal; a scanning unit that scans the projection target surface with a laser light emitted from the laser light source; a control unit that controls the scanning unit according to the image signal; a photodetector that detects the reflected and scattered light of the laser light which was reflected and scattered by the projection target surface; and a correction unit that corrects intensity of the laser light source based on the output signal of the photodetector and the image signal.

According to the above configuration, an image can be corrected according to the reflectance corresponding to the wavelength of the laser light source on the projection target surface.

The laser light source may be a plurality of laser light sources that emit lights having wavelengths which are different from each other.

According to the above configuration, an image can be corrected according to the spectral reflectance corresponding to each wavelength of the plurality of laser light sources on the projection target surface.

The correction unit may further include a storage unit that maps and stores a reflected and scattered light quantity for each laser light source, detected by the photodetector, and a scanning angle of the scanning unit.

According to the above configuration, an image can be corrected according to the spectral reflectance distribution on an entire projection surface.

The photodetector may include a filter that selectively transmits each wavelength of the plurality of laser light sources.

According to the above configuration, a precise spectral reflectance with respect to the wavelength of the laser light source can be measured.

It is preferable that the plurality of laser light sources are driven by pulses in time division, and the photodetector detects the reflected and scattered light quantity of each laser light source synchronizing with the drive timing of the laser light source.

According to the above configuration, the reflected and scattered light quantity for each laser light source can be detected without using a wavelength selection filter, so the configuration of the photodetector can be simplified.

The photodetector may detect the laser light which was reflected and scattered on the projection target surface, and then entered via the scanning unit.

According to the above configuration, the reflected and scattered light that entered from the portion being scanned with laser light can be accurately detected.

The scanning type image display device may further include a pin hole that is disposed between the scanning unit and the photodetector.

According to the above configuration, the reflected and scattered light from a portion being scanned with the laser beam can be blocked, so the reflected and scattered light of the laser light can be detected at high precision.

It is preferable that the diameter of the pin hole is $(D+L\times 0.0024)$ or more and $(D+L\times 0.0072)$ or less, where D denotes a diameter of the laser light in the scanning unit, and L denotes a distance between the scanning unit and the pin hole.

According to the above configuration, the reflected and scattered light of the laser light of the detection target can transmit through the pin hole with certainty, and the return light from the adjacent scanning area can be blocked, so the reflected and scattered light of the laser light can be detected at higher precision.

The scanning type image display device may be disposed on a same substrate as the photodetector, and further includes a light source output detector that detects the output of the laser light source.

According to the above configuration, the photodetector and the light source output detector are integrated on a same substrate, so the scanning type image display device can be downsized. Since the area on the same substrate is divided into areas for the photodetector and the light source output detector, cost can be decreased.

The scanning type image display device may further include a positional stability detection unit for detecting a change of position of this device.

According to the above configuration, image correction according to the motion (change of position) of the scanning type image display device can be possible.

The laser light sources may be the laser light sources of three colors: red, green and blue.

According to the above configuration, a full color image can be displayed.

The light source output detector for detecting the laser light sources of the three colors, red, green and blue, and the photodetector may be disposed on a same substrate.

According to the above configuration, the full color supported scanning type image display device can be downsized.

The scanning image display device may have an acousto-optical element or an electro-optical element for modulating the intensity of the laser light.

According to the above configuration, high-speed external modulation of the laser light becomes possible, and a solid state laser excited by a semiconductor laser can be used as a light source.

It is preferable that the output of the laser light source is modulated based on the modulation signal, and the output from the photodetector is synchronously detected based on the modulation signal.

According to the above configuration, a good detection signal with a large signal-to-noise ratio is obtained, and correction processing with higher precision becomes possible.

An image correction method according to another aspect of the present invention has: a step of modulating laser light according to an image signal and scanning the projection surface with the light using a scanning unit; a step of measuring the light quantity of the laser light which was reflected and scattered on the projection surface for each wavelength; a step of mapping the detected light quantity for each wavelength and a scanning angle of the scanning unit; and a step of correcting the image by controlling the intensity of the laser light based on the mapped information.

According to the above method, an image can be corrected according to the spectral reflectance distribution corresponding to the wavelength of the laser light source on the entire projection surface.

A step of projecting a white image may be included. According to this configuration, the spectral reflectance of the projection surface can be easily measured. It is preferable that the laser light is not output when the detected light quantity of each wavelength is a predetermined value or less for the entire wavelength. Thereby oscillation of the laser light is stopped for an area where no projection surface exists, or where reflectance of the projection surface is extremely low, so as to minimize the power consumption. The output intensity to the laser light may be controlled based on the ratio of the detected light quantity of each wavelength. Thereby an image can be corrected according to the color irregularity on the projection surface. The output intensity of the laser light may be controlled based on the detected light quantity of each wavelength and the light quantity ratio. Thereby the image can be corrected according to the average reflectance irregularity on the projection surface.

INDUSTRIAL APPLICABILITY

The projector of the present invention can be used as a portable compact image display device, or an image display device enclosed in a portable equipment.

Concrete embodiments or examples used in the detailed description of the invention are for clarifying the technical content of the present invention, and should not be interpreted to limit the present invention to the embodiments alone, but can be modified in various ways within the scope of the spirit of the present invention and the patent claims to be described next.

The invention claimed is:

1. A projector, comprising:
   a light source;
   a light modulation unit that modulates a light emitted from the light source based on image signals;
   a display control unit that outputs the image signals including cyclic main image signals to the light modulation unit and controls the display thereof;
   a projection unit that projects the light modulated by the light modulation unit; and
   an imaging unit that captures an image based on the light projected from the projection unit,
   wherein the display control unit inserts a correction image signal for projecting a correction image, which is visually recognizable as a uniform white or gray screen when time integration is performed, between the cyclic main image signals.

2. The projector according to claim 1, wherein
   the imaging unit captures only the correction image in synchronization with a projection timing of the correction image.

3. The projector according to claim 2, wherein
   the correction image comprises at least two images that cancel the difference of color or brightness in an image plane when time integration is performed.

4. The projector according to claim 1, wherein
   the projection unit projects the correction image with white light.

5. The projector according to claim 1, wherein
   the projection unit projects the correction image that includes at least a red image, green image and blue image.

6. The projector according to claim 1, wherein
   the projection unit projects a correction image that includes at least two images having complementary colors.

7. The projector according to claim 1, wherein
   the projection unit projects a correction image that cancels color or brightness of a projection target captured by the imaging unit during a non-projection period of a main image to be projected at a predetermined frequency, and that is visually recognizable as uniform white or gray in a plane of the projection target when time integration is performed.

8. The projector according to claim 1, wherein
   the correction image comprises at least two pattern images of which brightnesses are inverted from each other.

9. The projector according to claim 8, wherein
   at least one of the pattern images has a lattice pattern.

10. The projector according to claim 8, wherein
    at least one of the pattern images is a two-dimensional code.

11. The projector according to claim 10, further comprising:
    an analysis unit that extracts information from the two-dimensional code captured by the imaging portion.

12. The projector according to claim 1, further comprising:
    a correction unit that corrects the main image signals based on the correction image captured by the imaging unit,
    wherein the correction unit corrects distortion of the main image.

13. The projector according to claim 1, wherein the correction image is one or a plurality of uniform images.

14. The projector according to claim 13, further comprising:
a correction unit that corrects the main image signals based on the correction image captured by the imaging unit,
wherein the correction unit corrects a color of the main image.

15. The projector according to claim 1, wherein the light source is an LED.

16. The projector according to claim 1, wherein the light source is a laser.

17. The projector according to claim 1, wherein the projection unit includes a projection lens that projects light modulated by the light modulation unit, and the imaging unit also uses the projection lens as an imaging lens.

18. The projector according to claim 17, wherein the projection unit comprises:
a polarized beam splitter that separates light according to polarization; and
a ¼ wavelength plate that is disposed between the polarized beam splitter and the projection lens and sets the phase difference between an outgoing path and returning path of the light that reciprocatingly transmits through the projection lens to $\pi/2$.

19. The projector according to claim 1, wherein a drive frequency of the main image is 180 Hz or more.

20. The projector according to claim 1, wherein the light modulation unit is a spatial modulation element that spatially modulates light.

21. The projector according to claim 20, wherein the spatial modulation element is a reflection type signal plate liquid crystal display element.

22. The projector according to claim 20, wherein the spatial modulation element is a plurality of micromirrors that can change the angle.

23. The projector according to claim 1, wherein the light modulation unit comprises:
a scanning unit that performs light scanning two-dimensionally; and
an intensity modulation unit that can modulate an intensity of light that enters from the light source to the scanning unit.

24. The projector according to claim 1, further comprising:
a processing unit that computes prediction of a change in the projection target based on a plurality of the correction images captured in different frames by the imaging unit.

25. The projector according to claim 1, further comprising:
a signal transmission/reception unit that transmits/receives a synchronization signal that indicates a timing to project the correction image.

26. The projector according to claim 1, further comprising:
a switching unit that switches setting whether the correction image signal is inserted between the cyclic main image signals or not.

27. The projector according to claim 26, further comprising:
a motion sensor that detects motion of the projector,
wherein the switching unit inserts the correction image signal when the motion sensor detects motion, and does not insert the correction image signal when the motion sensor does not detect motion.

* * * * *